(12) United States Patent
Camacho et al.

(10) Patent No.: US 7,877,611 B2
(45) Date of Patent: Jan. 25, 2011

(54) METHOD AND APPARATUS FOR REDUCING ON-LINE FRAUD USING PERSONAL DIGITAL IDENTIFICATION

(75) Inventors: Luz Maria Camacho, Orlando, FL (US); Roger D. Pirkey, Hudson, FL (US); Michael L. Hankinson, Pine, CO (US)

(73) Assignee: Aurora Wireless Technologies, Ltd., Taipei (TW)

( * ) Notice: Subject to any disclaimer, the term of this patent is extended or adjusted under 35 U.S.C. 154(b) by 2051 days.

(21) Appl. No.: 09/801,468

(22) Filed: Mar. 7, 2001

(65) Prior Publication Data
US 2003/0208684 A1 Nov. 6, 2003

Related U.S. Application Data

(60) Provisional application No. 60/187,927, filed on Mar. 8, 2000.

(51) Int. Cl.
*G06F 21/00* (2006.01)
(52) U.S. Cl. .................................. 713/182; 726/26
(58) Field of Classification Search .............. 713/202, 713/182; 726/1, 26
See application file for complete search history.

(56) References Cited

U.S. PATENT DOCUMENTS

| | | | |
|---|---|---|---|
| 5,335,278 A | 8/1994 | Matchett et al. ............... 380/23 |
| 5,386,104 A | 1/1995 | Sime ........................... 235/379 |
| 5,420,908 A | 5/1995 | Hodges et al. ................. 379/58 |
| 5,555,551 A | 9/1996 | Rudokas et al. ............... 379/59 |
| 5,602,906 A | 2/1997 | Phelps ......................... 379/114 |
| 5,627,886 A | 5/1997 | Bowman ...................... 379/111 |
| 5,708,422 A * | 1/1998 | Blonder et al. ............. 340/5.41 |
| 5,784,566 A * | 7/1998 | Viavant et al. .............. 709/229 |
| 5,802,199 A | 9/1998 | Pare, Jr. et al. .............. 382/115 |
| 5,872,834 A | 2/1999 | Teitelbaum ............... 379/93.03 |
| 5,937,162 A | 8/1999 | Funk et al. ............. 395/200.36 |
| 5,991,735 A | 11/1999 | Gerace ......................... 705/10 |
| 6,021,496 A | 2/2000 | Dutcher et al. |
| 6,026,379 A | 2/2000 | Haller et al. |
| 6,092,192 A | 7/2000 | Kanevsky et al. ........... 713/186 |

(Continued)

FOREIGN PATENT DOCUMENTS

EP 0 560 574 A2 9/1993

(Continued)

OTHER PUBLICATIONS

Fu, et al., Implementation of Secure Electronic Trading Process, Information Industry Co., Ltd., pp. 1-13, (Feb. 1999).

*Primary Examiner*—Christopher J Brown
(74) *Attorney, Agent, or Firm*—Pillsbury Winthrop Shaw Pittman LLP

(57) ABSTRACT

A distributed Personal Digital Identification (PDI) system and architecture rapidly verifies individuals using biometric data or other tokens prior to approving a transaction and/or granting access to an on-line services and other network services. The architecture that includes a server that has access to template data required to authenticate individuals, and the processing capacity to route authenticated requests to the appropriate downstream entity (Internet Service Provider, Credit Card Company, etc.). The server is connected to requesting users by various network methods to form a client/server architecture. The server and clients each contain discrete subsystems, which provide various levels of authentication services to users of the system.

42 Claims, 17 Drawing Sheets

U.S. PATENT DOCUMENTS

| | | | |
|---|---|---|---|
| 6,104,922 A | 8/2000 | Baumann | 455/410 |
| 6,105,010 A | 8/2000 | Musgrave | 705/44 |
| 6,154,727 A | 11/2000 | Karp et al. | 705/3 |
| 6,157,707 A * | 12/2000 | Baulier et al. | 379/189 |
| 6,158,010 A | 12/2000 | Moriconi et al. | 713/201 |
| 6,163,604 A * | 12/2000 | Baulier et al. | 379/189 |
| 6,167,517 A * | 12/2000 | Gilchrist et al. | 713/186 |
| 6,195,568 B1 | 2/2001 | Irvin | 455/563 |
| 6,415,277 B1 * | 7/2002 | Klatt et al. | 707/1 |
| 6,466,918 B1 * | 10/2002 | Spiegel et al. | 705/27 |
| 6,845,448 B1 * | 1/2005 | Chaganti et al. | 713/166 |
| 6,931,402 B1 * | 8/2005 | Pereira, III | 707/9 |

FOREIGN PATENT DOCUMENTS

| | | |
|---|---|---|
| EP | 0 897 164 A2 | 2/1999 |
| EP | 0 477 570 B1 | 5/1999 |
| GB | 2 237 670 A | 5/1991 |
| WO | WO 00/10286 | 2/2000 |

* cited by examiner

METHOD AND APPARATUS FOR REDUCING ON-LINE FRAUD USING PERSONAL DIGITAL IDENTIFICATION

CROSS-REFERENCE TO RELATED APPLICATION

The present application is based on, and claims priority from, U.S. Appln. No. 60/187,927, filed Mar. 8, 2000 and entitled "Method and Apparatus for Reducing On-Line Fraud Using Personal Digital Identification," commonly owned by the assignee of the present application, the contents of which are incorporated herein by reference.

BACKGROUND OF THE INVENTION

1. Field of the Invention

The present invention relates to data communications and E-commerce, and more particularly, to a method and apparatus for detecting and reducing fraudulent use of Business-to-Consumer (B2C), Business-to-Business (B2B) and other transaction services using Personal Digital Identification (PDI) techniques.

2. Description of the Related Art

With the growing use of the Internet and the concurrent increase of E-commerce and other Business-to-Consumer (B2C) transactions, purchases of goods and services that are conducted without an individual present to show identification will also increase. Access to on-line accounts is also granted without the presence of an individual to confirm or authenticate the accessing user.

One B2C transaction problem of concern is credit card fraud. Hackers, scam artists, and criminals can always find a weak link in conventional authentication methods. This is because, although many measures have been developed to protect the card-issuing banks and consumers against fraud, they provide only illusory protection—what is authenticated is information that is known or possessed, not the individual. Accordingly, after the industry stops one leak, another leak is discovered and exploited.

Another B2C problem of growing concern is employee abuse of company resources, as access by employees to the Internet using company equipment is readily possible in most companies. Although not all employees abuse Internet service, the cumulative use of all employees can result in much time and resources being taken away from an employer.

Relatedly, supervision of a child's on-line activities is a concern for parents. Although there are many "parental control" software products available on the market, most reside directly on the end-user's PC and can be turned off at any time by either the minor or the parent and in some cases be circumvented by other software applications.

Another growing concern is subscription/account fraud. The exchange of account information among individuals is decreasing the revenues received by Internet Service Providers (ISPs). In addition to lost revenue on subscriptions that are not paid for comes the requirement for additional capacity to support authorized and unauthorized users accessing ISP services.

In addition to lost revenue from unauthorized "subscribers," ISPs have other concerns. Many ISPs host web pages. One potential problem is if an intruder gains access to the host, the intruder may be able to change information on the host's web page, thus possibly subjecting the ISP to further liability. Moreover, an intruder could use a public web site as an entry point into a company's internal files and gain access to confidential information such as competitively sensitive business information or information about the company's clients and/or employees that could be protected by privacy laws. This could be particularly serious for an ISP that is also a cable company, which maintains extensive customer data. A related problem, referred to as a "Trojan Horse," occurs when an intruder enters an ISP web site with the intention of gaining unauthorized access to other computer systems by concealing his/her true identity by use of the web site. Once again, potential ISP liability arises if the intruder launches his or her attack from the ISP's web site. Counteractive efforts that an ISP can undertake range from common-sense precautions to reporting suspicious activity to the FBI. Some of the more conventional methods include: posting a log-in banner that warns unauthorized users that they may be subject to monitoring; using audit trails within the computer network; keystroke level monitoring; caller identification; establishing internal passwords and changing them frequently; installing anti-virus software on every PC; installing "firewall" software to limit access; making back-ups of any damaged or altered files; maintaining old back-ups to demonstrate the status of the original; designating one person to secure potential evidence of fraudulent activity; establishing procedures to secure tape back-ups and print-outs.

In addition to B2C transactions, Business-to-Business (B2B) transactions encounter many of the same difficulties in authenticating the validity of activities committed by an individual. Although corporate and individual Digital Certificates and passwords/Personal Identification Numbers (PINs) are currently deployed, they can be shared and exploited if in the wrong hands.

All the conventional methods for reducing fraud have drawbacks and limitations. Primarily, firewalls and other log-ins and passwords do not protect against unauthorized access where the thief already knows account information, passwords or possesses digital credentials. Similarly, post-hoc fraud detection procedures can only be effective if the unauthorized user can be found and prosecuted.

Accordingly, there remains a need for a method and apparatus for proactively reducing transaction-based fraud where the requesting individual is not known, or physically present, to provide identification.

SUMMARY OF THE INVENTION

Generally, the present invention provides a method and apparatus for authenticating transactions conducted by an individual or agent by comparing biometric data and/or profiles to known templates previously provided to the system in a certifiable environment. If transaction authentication cannot be achieved, business rules of the apparatus are used to determine successive action.

In accordance with one aspect of the invention, in order to reduce or prevent unauthorized access to finances or other resources, the invention detects and controls both merchant and consumer transactions through the use of apparatus profiling and biometric credential comparisons. A dynamic profile is created and/or updated for each consumer/merchant using the invention, by means of adaptive learning techniques. The apparatus algorithms use transaction data vectors such as purchase patterns, method of payment, location of purchases and purchaser, and various other elements to create profiles. Historical profiles and the current transaction are used to determine the method of authentication. System rules dictate conditions which must be met such as time of day, day of week, login location, or other established criteria, in order to authenticate/grant access to services. Depending upon pre-established business rules and the determined need for transaction authentication, biometric comparisons, digital code matching, a combination thereof, or other methods are deployed.

BRIEF DESCRIPTION OF THE DRAWINGS

These and other objects and advantages of the present invention, along with the best mode for practicing it, will become apparent to those skilled in the art after considering the following detailed specification, together with the accompanying drawings wherein.

DETAILED DESCRIPTION OF THE INVENTION

Figure 1:
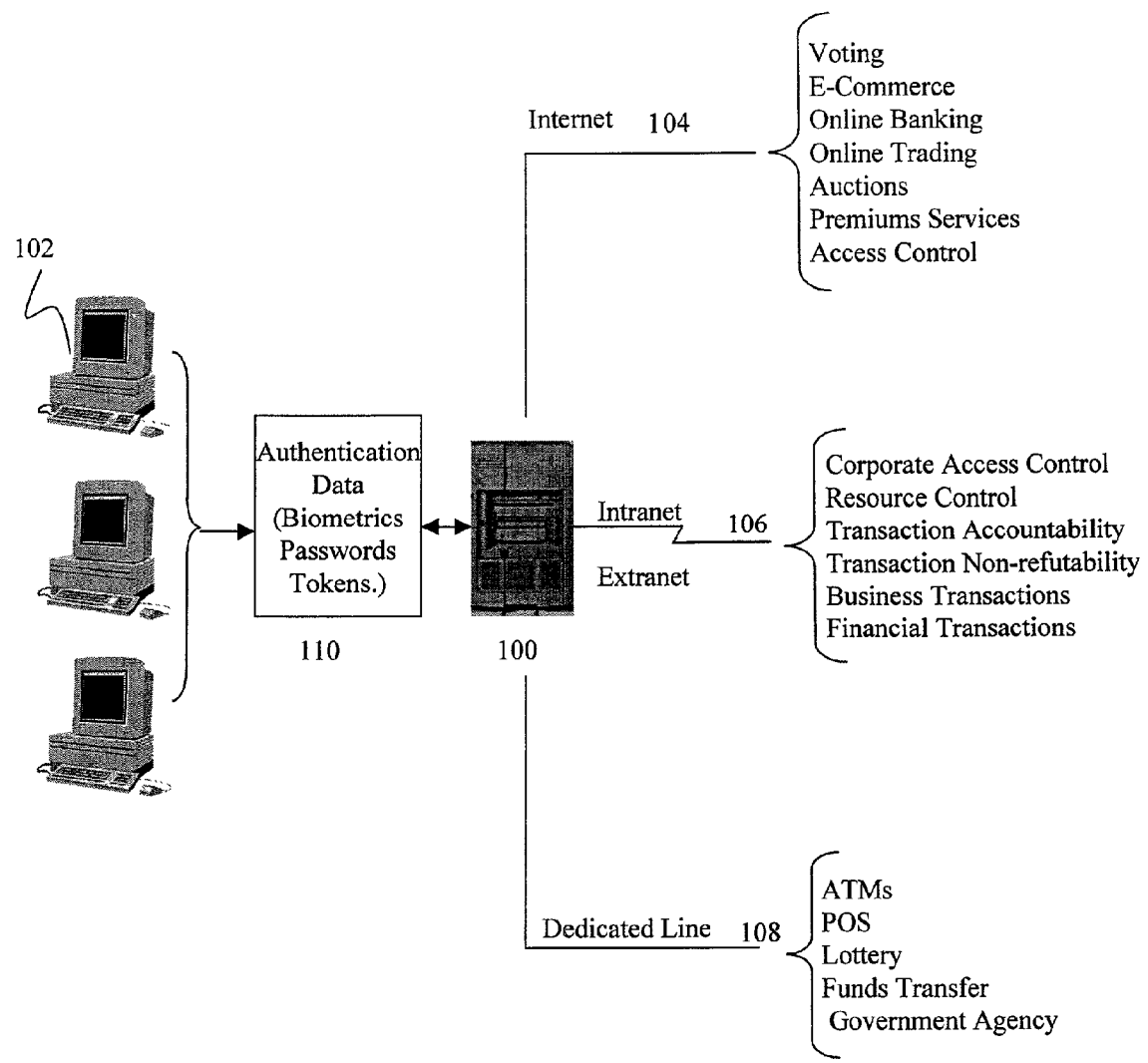
FIG. 1 is a block diagram illustrating an overview implementation of the present invention.

FIG. 1 illustrates an overview implementation of the present invention, in which PDI system 100 interacts with persons using clients 102 who seek access to resources through such routes as the Internet 104, intranet/extranet environments 106 and dedicated or leased lines 108. In accordance with an aspect of the invention, in some cases system 100 requires such persons to provide unique personal identification information 110 such as fingerprints or tokens before permitting access to services, or approving a transaction via the services, thus protecting consumer and provider alike from fraud or misuse by unauthorized individuals.

The access routes 104, 106 and 108 shown in FIG. 1 are intended to be illustrative rather than limiting. Those skilled in the art will understand that not all these types of accesses need be included and that other types of access routes may be added while remaining within the concept of the invention. Further, although other services are capable of being provided and/or controlled by the present invention, as shown in FIG. 1, Internet 104 accessed services can include, for example, on-line voting, e-commerce, on-line banking, on-line trading, auctions, premium services and access control. Intranet/extranet environment 106 accessed services can include, for example, corporate access control, resource control, transaction accountability, transaction non-refutability, business transactions, financial transactions. Dedicated or leased line 108 accessed services can include, for example, automated teller machines (ATMs), point-of-sale (POS) terminals, lottery terminals, finds transfer terminals and government agency terminals. Generally, the principles of the present invention can be extended to other types of services and access routes in which identification authentication is desirable, as will be understood by those skilled in the art.

As will be described in more detail below, whereas conventional methods use post-hoc artificial intelligence or tracking procedures to determine when an account is potentially associated with fraudulent or abnormal behavior, if at all, the PDI system 100 of the present invention uses a combination of fraudulent behavior detection and identification verification measures to preemptively authenticate a purchase from, or access to, a service. For example, purchases over the Internet made using credit cards issued by banks may require PDI authentication all of the time due to the inability to verify users with mere account information. Alternatively, the PDI system 100 can generate a list of known purchase points (web sites) associated with a consumer, and when those sites are used in successive transactions, the consumer is not prompted to enter a PDI, because that activity is part of the consumer's current profile. In contrast, if the consumer initiates a purchase transaction at a site that is not part of the consumer's profile, the consumer will be prompted to enter the appropriate PDI authentication as a means of ensuring and verifying that the credit card belongs to the holder.

PDI system 100 maintains business rules (also known as constraints) in addition to the consumer's own PDI Profile. To meet security requirements of the specific domain, the PDI system administrator configures these business rules, as that term is used herein, based upon company (e.g. a card-issuing bank, an ISP or a company Intranet) needs. For example, business rules can include lists of sites that are marked as always requiring authentication regardless of historical profile, which sites have been identified as having been associated with fraud in the past. Conversely, business rules can determine which sites never require authentication, or only constrain authentication by specific rule sets, such as sites that are considered secure and typically not associated with suspicious activity.

PDI system 100 further provides pre-emptive security for card-issuing banks and other network services. For example, if an account is being used fraudulently, the individual committing fraud may have access to the account holder's name, address, account number and other information that is typically required to allow access to the account. Another case is that of "Account" information shared among multiple individuals. For example, an individual who subscribes to a service that requires a login and password may share the login and password data among several individuals who now use the service fraudulently, with only one billable account.

As will be described in more detail below, PDI system 100 preferably includes a facility/server which provides PDI services and methods in accordance with the invention that protect consumers and service providers against unauthorized usage, and in particular, transactions over open networks. The PDI system 100 utilizes a database that stores and maintains unique identifying information, which identifying information constructs user and organizational profiles. Conventional information can also be stored, such as contact information, credit card numbers, transaction data, billing information, and related historical profile vectors. It should be understood that the PDI system of the invention may further include means to collect and process transaction information, and to build user profiles, company profiles, and default profiles based upon presented data.

The PDI system 100 is ordinarily located at a remote location relative to the clients 102, and can provide a centralized source of authentication for users that operate the clients 102 to seek access to resources of services through 104, 106 and 108. Alternatively, the system can reside upon company premises or be centralized to provide many establishments the PDI system in a service bureau manner. Although PDI system 100 is shown separately from the service providers accessed through Internet 104, intranet/extranet 106 and dedicated lines 108 for clarity of the invention, it should be understood that the installed location of the present invention is highly configurable due to its distributed design. For example, the PDI System 100 can reside directly at a site such as an electronic storefront; it can be located at an independent location such as a service bureau facility to process transactions from multiple locations; and/or can reside directly at the site whose service is being requested.

Figure 2:
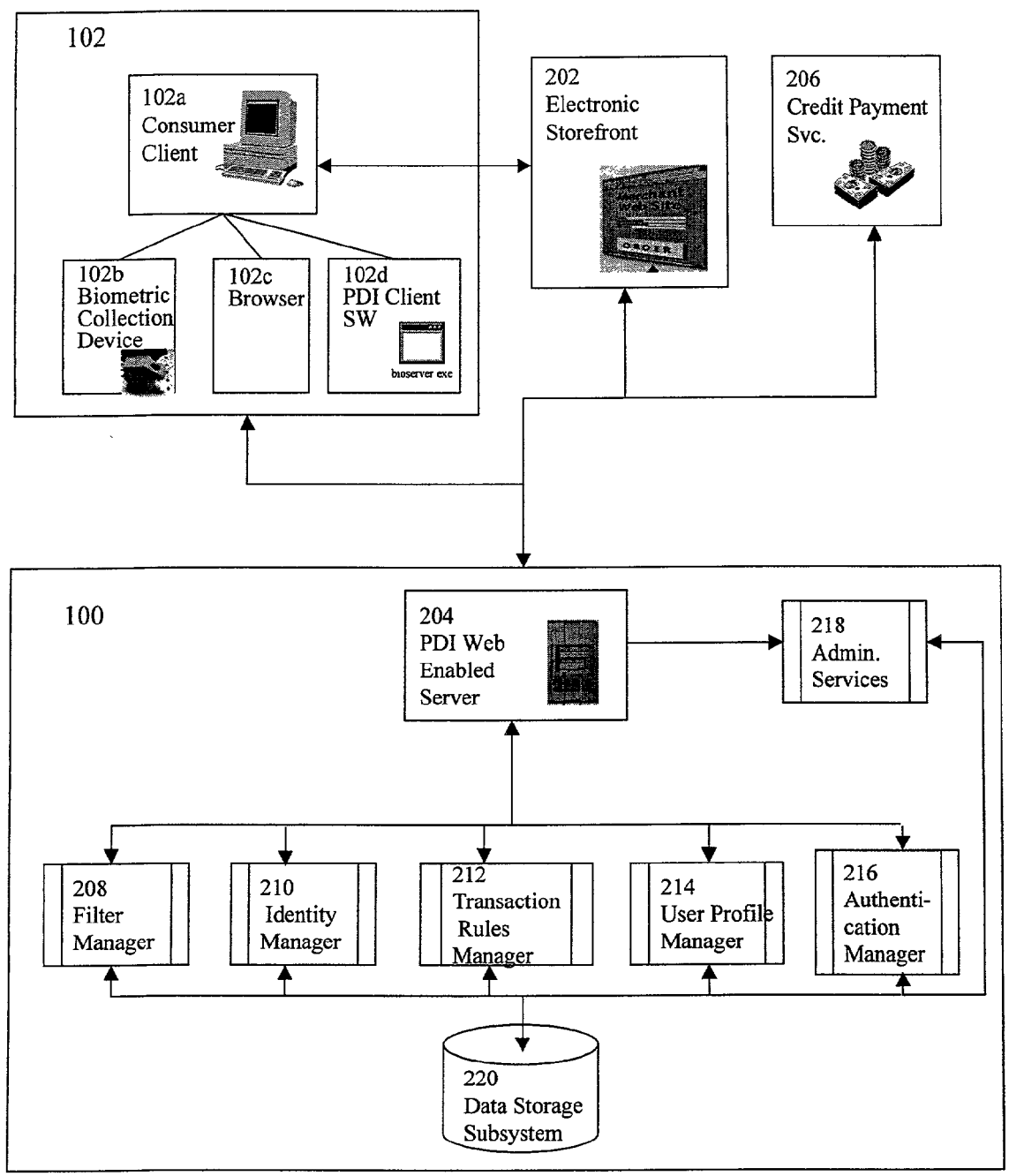
FIG. 2 is a block diagram further illustrating an exemplary implementation of the present invention in accordance with a preferred embodiment.

FIG. 2 is a block diagram illustrating an exemplary implementation of the present invention. Such an implementation will demonstrate the use of the PDI System 100 in an online retail environment. Those skilled in the art will be able to understand how to extend the principles of the invention to other types of environments after being taught by the foregoing example.

As shown in FIG. 2, the PDI System 100 includes a digital computer(s) acting as a server 204 that communicates with several subsystems: Filter Manager 208, Identity Manager 210, Transaction Rules Manager 212, User Profile Manager 214, Authentication Manager 216, and Administrative Services Manager 218, which subsystems can be implemented as software processes executing on one or more processors. The digital computer(s) acting as a server 204 further communicate(s) with a Data Storage Subsystem 220 that facilitates access to persistent PDI System 100 data by using functional procedure calls and requests to local or remote file system or data base management system (DBMS) processes and threads executing on one or more processors to access the data from one or more mechanical and/or solid state storage device(s). The various components of PDI system 100 can be interconnected by a network such as a LAN or WAN and communicate via protocols such as TCP. The PDI System 100 communicates with a client system 102, an electronic storefront 202, and a credit payment service 206 by way of data communications networks such as the Internet 104, intranet/extranet 106 and/or dedicated line 108. The exemplary implementation described in detail below will assume that the network components are connected via the Internet.

FIG. 2 further illustrates an example of a client 102 that can be used in the PDI system architecture of the present invention. As further shown in FIG. 2, the client system 102 is comprised of a digital computer 102a, a biometrics collection device 102b, an industry-standard web browser 102c, and PDI client software 102d.

Clients 102 will be described in detail herein with reference to the appropriate hardware and software needed to interact with server 204 for submitting user identification data to the PDI system 100 for authentication services and transactions. However, it should be apparent that clients 102 can include other conventional functionality that is not necessary for the present invention and therefore will not be described so as not to obscure the invention.

Digital computer 102a is preferably a PC or other type of computer that includes a data communications access device, such as a modem or other network interface, which allows the consumer to access the Internet. It should be understood that many alternatives to digital computer 102a are possible, and can include all computing devices that are, or can be used to communicate and conduct electronic-commerce and other access transactions over communications networks, with such computing devices including but not limited to servers, workstations, laptops, palm and handheld computers.

As will be described in more detail below, PDI client software 102d can be implemented as a plug-in application to industry-standard browser 102c, such as Internet Explorer or Netscape Communicator. In an example of the invention where fingerprints are used as the authenticating biometric data, biometrics collection device 102b and PDI client software 102d incorporate commercial fingerprint sensing devices and application program interfaces provided by vendors such as American Biometrics Corporation, Veridicom, etc., in order to format such collected data for communication with the PDI System 100.

The electronic storefront 202, in this example, is an Internet-based merchant site such as Amazon.com. The client system 102 accesses, and requests the purchase of goods or services from, electronic storefront 202 by means of industry-standard web browser 102c. The specific electronic storefront 202 generates the needed purchase forms, which in turn are filled out by the consumer and submitted for processing by the electronic storefront 202. Once the form data has been submitted by the consumer, the electronic storefront 202 forwards the purchase request to the PDI System 100 for authentication determination and further processing. This process will be described in further detail below.

Communications between the client 102, the electronic storefront 202, the PDI web-enabled server 204, and the credit payment service 206 can be performed using standard Hypertext Transfer Protocol (HTTP) as implemented by industry standard web browsers and servers. Further communication protocols such as Common Gateway Interface (CGI) may be used to transfer HTML form data between system components. In general, the PDI system preferably uses known and accepted protocol standards deployed within the World Wide Web such as Java Script and/or other client-side web-based APIs and programs, and server-side processes and APIs (e.g., C/C++, CGI, PHP, and other server-side APIs, or combination thereof).

The PDI system 100 as further illustrated in FIG. 2 generally operates as follows. The PDI web-enabled server 204 accepts the purchase request from authorized electronic storefront sites. The request is first processed to ensure that business-filtering rules are applied to the transaction by way of the Filter Manager 208. This filtering process quickly identifies those transactions that warrant further authentication, or which may be immediately rejected by the system. After the request is evaluated, the transaction is processed by the Identity Manager 210. The Identity Manager ensures that the required information is available to the PDI system 100 to properly identify the consumer and ensure that registration information is available. After the Identity Manager 210 retrieves the consumer context, the Transaction Rules Manager 212 then processes the request. For example, the Transaction Rules Manager 212 processes the request against company level (i.e. business) rules to determine if authentication is required and, if so, what type should be requested of the consumer. After this determination, the User Profile Manager 214 evaluates the current request against historical profile information associated with the consumer, and processes the request accordingly. When the User Profile Manager 214 completes the request evaluation, the resultant data is forwarded to the Authentication Manager 216 which, if required, initiates a dialog with the client 102, and collects and evaluates the authentication data against stored templates. If the authentication data is properly collected and authenticated, the request is forwarded to the credit payment service 206 for approval of credits and debits. If the request is not properly authenticated, the requestor and the electronic storefront 202 are notified, and the purchase transaction does not complete, from a PDI system 100 perspective. The consumer must re-submit the transaction request again, if permitted to do so.

Administrative Services Manager 218 permits system administrators to manage the PDI System 100 including, for example, to (1) manage attributes associated with PDI System 100 system administration and PDI System 100 Subscriber/Consumer accounts; (2) generate change requests and problem reports; (3) access on-line PDI System 100 documentation; (4) generate reports detailing with various aspects of the PDI System 100; (5) perform certain operations and maintenance (O&M) activities to ensure the health of the PDI System 100; and (6) create, modify, and delete Rule sets which affect PDI System 100 processing. With the exception of administration of Rule Sets, the above administration functions are generic in that they apply to almost all systems from a system administration standpoint. Generally, Rule Sets control the acceptance or denial of, or authentication method applied to, transactions passing through the PDI System 100.

In one example of the invention, there are eight broad Rule categories where associated business and other rules can be created, modified or deleted using the Rules functionality of the Administrative Manager 218. These eight Rule categories are: (1) Behavior, for threshold-based relationships; (2) Boolean, for simple logic (e.g., ship-to-address !=bill-address); (3) Global, for processes and methods to be applied to all transactions; (4) Identity, for specific consumer-based activities; (5) Network, for specific network element-based activities; (6) Profiles, for aggregated transaction content-based activities; (7) Purchases, for single transaction content-based activities; and, (8) Transactions, for aggregated transaction externals-based activities.

The Global Rule category is the most controlling of the various Rule categories since its constraints affect each and every transaction processed by the PDI System 100. Only one of the following seven rules should be active at any given time: (1) No Global Constraints (PDI_AUTH_NONE), indicating that no constraints should be globally applied to each and every transaction. This is the default selection, and allows downstream rules processing to potentially determine the fate of a transaction; (2) Allow All Transactions (PDI_AUTH_ALLOW), indicating that each and every transaction is allowed to flow through the system without challenge. This effectively turns off the PDI System 100 Rule and Authentication logic; (3) Deny All Transactions (PDI_AUTH_DENY), indicating that each and every transaction should be denied without challenge. This effectively blocks all transactions from ever being sent to the Credit Payment Service 206; (4) Always Use Best Available (PDI_AUTH_BEST), indicating that for each and every transaction, the best method available on the Client 102*a* should be used, depending upon availability of the Biometric Collection Device 102*b*; (5) Always Use Biometrics (PDI_AUTH_FP), indicating that for each and every transaction, a biometric sample should be used to authenticate the requesting individual; (6) Always Use Digital Code (PDI_AUTH_DC), indicating that for each and every transaction, a matching Digital Code from the requesting individual is required; (7) Always Use Biometrics and Digital Code (PDI_AUTH_FP_DC), indicating that both a Digital Code and a biometric sample from the requesting individual is required.

The Network Rule category provides for the creation of Rules based on the network elements associated with a given transaction. Generally, such rules are in a format such as "If <domain> equals/does not equal <value>, then <authentication>," where <domain> can be, for example, Merchant Domain, Merchant Address, Merchant Name, Client Domain, Client Address and <value> can be any User defined value, including wildcards, and <authentication> can be any authentication rule, such as PDI_AUTH_ALLOW, PDI_AUTH_DC, PDI_AUTH_BEST, PDI_AUTH_FP, PDI_AUTH_FP_DC, PDI_AUTH_DENY.

The Profiles Rule category provides for the creation of Rules based on data aggregates associated with both the current and historical activity of the transaction's requesting individual. Generally, such rules are in a format such as "If <domain> exceeds <quantity> within <time quantity>, then <authentication>," where <domain> can be, for example, Total Amount, Number of Transactions, Number of E-sites Visited, Number of ISP Login Sites, Number of Cards Used, Number of Authentication Failures, Number of Unique Ship-to-Addresses, Number of Unique Contact Addresses, Number of Unique Billing Addresses, <quantity> can be any user specified numeric value, and <time quantity> can be any user specified time quantity.

The Purchases Rule category provides for the creation of Rules based on certain purchase related data elements of a given transaction. Such rules can be in a format such as "If <domain> equals/not equals/greater than/less than <value>, then <authentication>," where <domain> can be, for example, Purchase Amount, Card Type, Expiration Date, Card Number, Bill-to-Country, Ship-to-Country and <value> can be a Domain specific user input or select list value.

The Transactions Rule category provides for the creation of Rules based on the network elements of a given transaction and a user defined time period. Generally, such rules can be in a format such as "If <domain> equals/not equals/greater than/less than/between/not between <time period> of <value>, then <authentication>," where <domain> can be, for example, Any Activity, E-Commerce, Certificate Authority, Point-of-Sale, Internet Service Provider, <time period> can be Time of Day (TOD), Day of Week (DOW), Absolute Date (AD), TOD+AD, TOD+DOW, and <value> can be any domain-specific select list value.

The created business and other rules as described above, and as will be described in more detail below, thus provide the authentication requirements used as a data resource of, or input data into, at least the Transaction Rules Manager 212, the User Profile Manager 214, and the Authentication Manager 216.

It should be noted that certain or all of the above-described rule administration functionality can be made available to users as well as system administrators via clients 102. For example, in addition to a company establishing its own business rules, an individual can establish personal business rules, such as personal spending limits on a per-transaction or cumulative basis over a specified time interval in an online retail environment. Limits can also be placed on subordinate accounts to authenticate, restrict and control authorized users of system services as determined by the master account. For example, a parent or employer can create sub-accounts for each child and/or employee and require authentication methods based on spending limits, access control, location, and other profile constraints that limits and controls activities of the associated sub-account. Other vertical services can leverage the profiling capabilities of the apparatus as well.

The credit payment service 206, as used in this example, receives the credit authorization requests from the PDI system 100 upon successful transaction processing and/or authentication, if required. Credit payment service 206 can be implemented by a service such as, for example, CyberCash, which is responsible for authorizing credit card purchases, and if approved, transferring the appropriate credits/debits to/from the consumer and electronic storefront 202 accounts.

Figure 3:
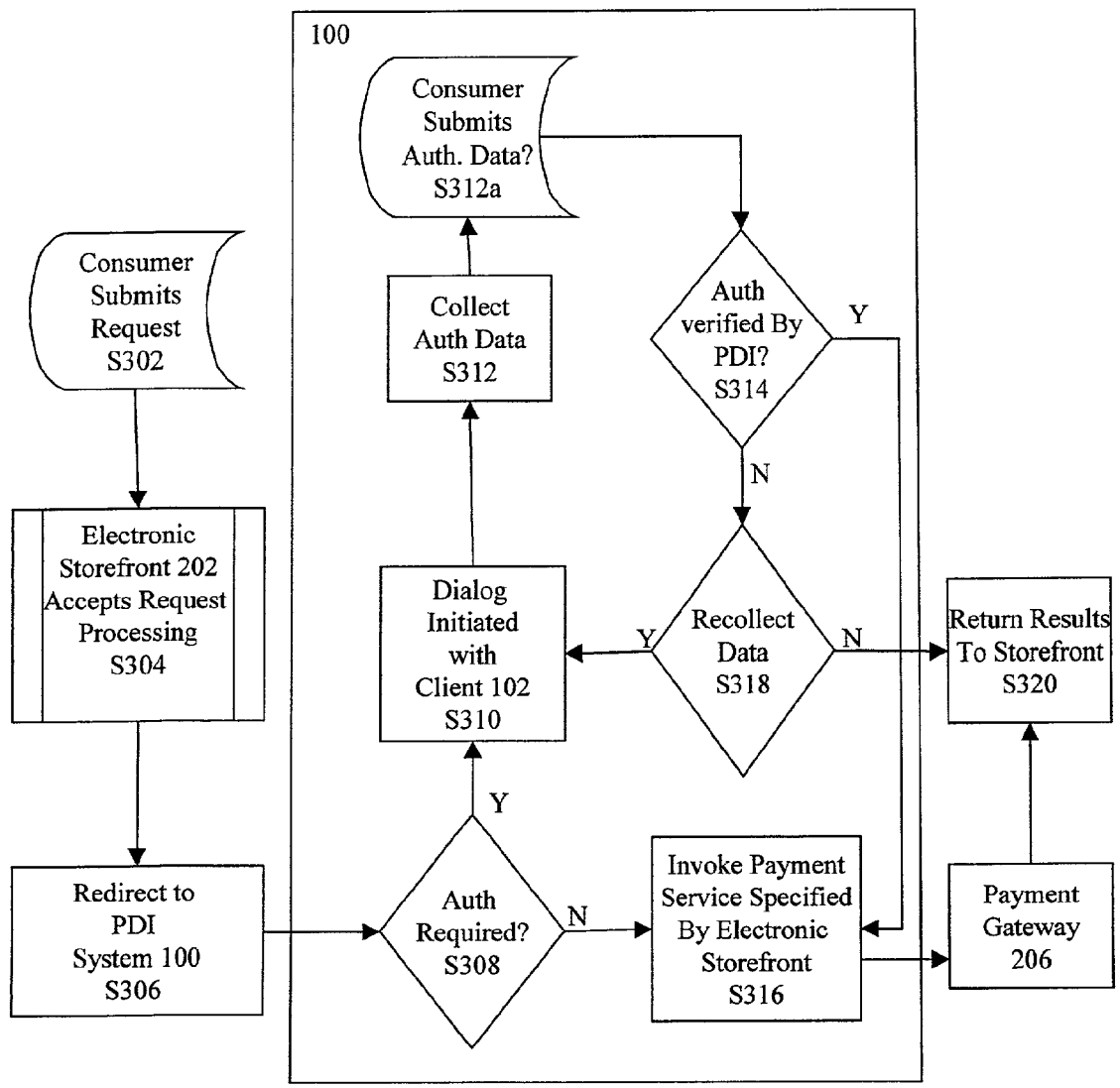
FIG. 3 is a high-level flowchart illustrating an example method implemented by the PDI system in accordance with one embodiment of the present invention.

FIG. 3 provides a high-level transaction flow diagram that illustrates the use of a PDI system 100 of the present invention. In this example, communication with all system components is through the Internet 104. A consumer using client 102a and web browser 102c accesses a desired electronic storefront 202 and submits a purchase transaction request (block S302). The electronic storefront 202 accepts the consumer's transaction request for processing (block S304). The electronic storefront 202 redirects all or a subset of the consumer's transaction request data to the PDI system 100 for authentication determination and further processing (block S306). Redirection can be by means of a Uniform Resource Locator (URL) specification by the electronic storefront, or other accepted manner of specifying the global address of documents and other resources on the World Wide Web.

If the PDI system 100 determines in block S308 that user authentication is not required, the PDI system 100 invokes the specified payment service (block S316), and the transaction request is forwarded and processed by the credit payment service 206. If however, authentication is required, a dialog is initiated with the client web browser 102c (block S310). The consumer submits the requested authentication information using the web browser 102c and/or a combination of the web browser 102c, biometrics hardware collection device 102b, and PDI client software 102d depending upon the authentication requested. Upon completion of the authentication data collection, the client browser 102c submits this information directly to the PDI System 100 (block S312).

If the PDI System 100 verifies the collected information from the client 102a (determined in block S314), the transaction request is forwarded (block S316) to the credit payment service 206, which authorizes the credit card purchase on behalf of the consumer and electronic storefront 202. The resulting approval or disapproval is returned to the electronic storefront (block S320).

If the PDI System 100 rejects the authentication data, depending upon the business rules of the system (block S318), blocks S310 through S314 may be repeated for a configured number of times. If the PDI System 100 determines that blocks S310 through S314 are not to be repeated, the PDI System 100 returns a "reject" return result to the electronic storefront 202 (block S320).

The functionalities of the various subsystems of the example PDI system 100 illustrated in FIG. 2, as well as the various data structures from storage subsystem 220 that they use, will now be described in more detail. It should be noted that the ordering, selection and division of functionalities performed by the various subsystems are not limited to the examples given below, and that those skilled in the art will recognize that many alternatives are possible.

Figure 4A:
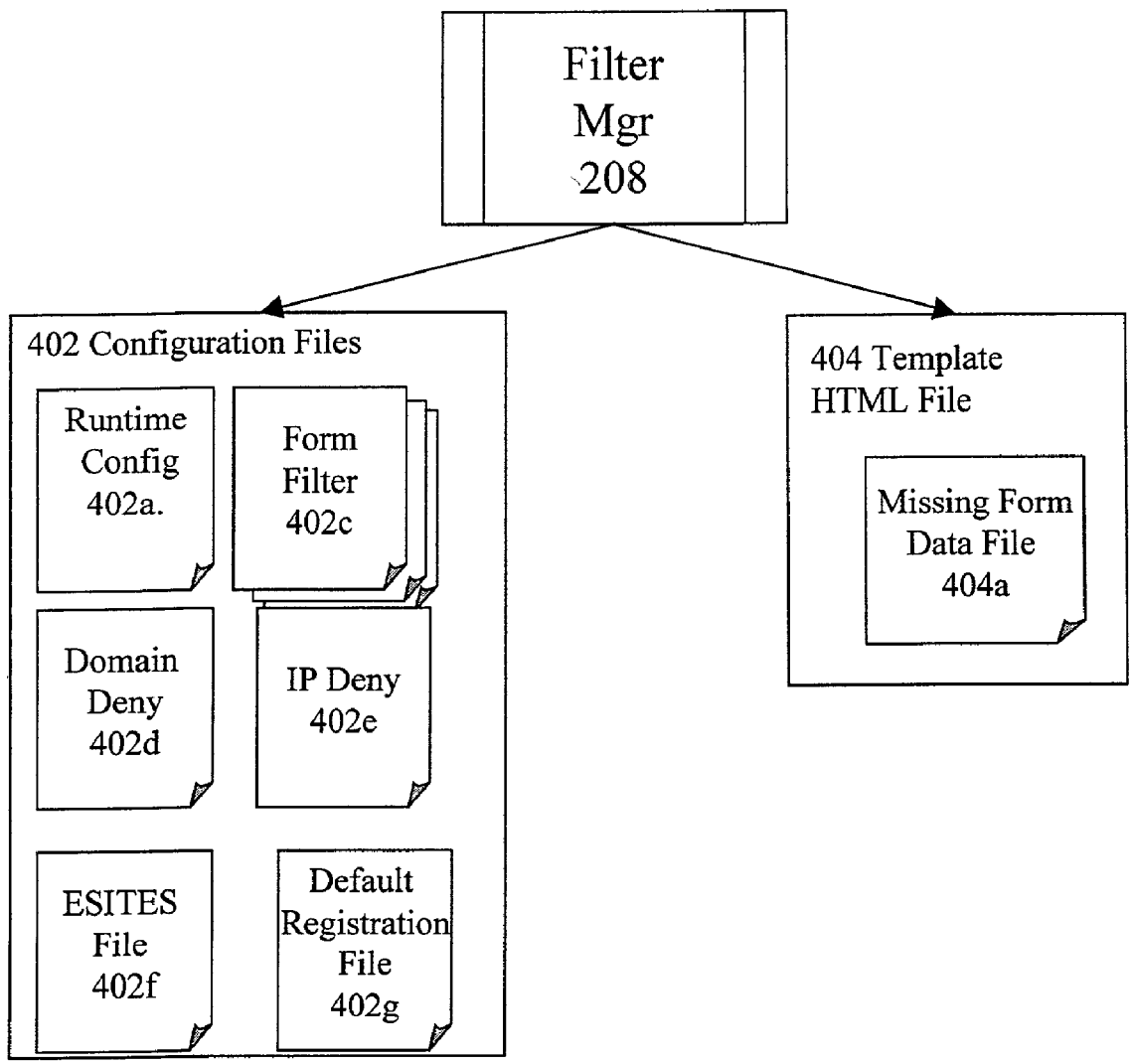
FIGS. 4A-4B further illustrate an example of the Filter Manager Process.

FIG. 4A outlines the components that comprise, or are accessed by, the Filter Manager 208. In one example, this subsystem can be implemented by a CGI program that acts as the primary redirection URL when an electronic purchase transaction is sent through the PDI web-enabled server 204. As shown in FIG. 4A, Filter Manager 208 accesses several configuration/parameter files from data storage subsystem 220 during processing. As will be described in more detail below, these files 402 establish the business rules of the PDI system 100, and determine which (and how) transactions will be processed by PDI. In addition, template HTML files 404 may be used to construct error messages back to the Client browser 102c as necessary. Although not shown in FIG. 4A, it should be understood that data storage 220 further includes a session data table to handle data storage for tracking and maintaining the current state of individual transaction sessions. The data table maintains transaction time, client IP address etc. and allows the PDI system 100 to monitor and allow transactions only from the same client by using stored components to validate the authenticity of the information received. Further, although shown separately for clarity of the invention, it should be noted that files 402 and 404 can be implemented as part of data storage subsystem 220.

Figure 4B:
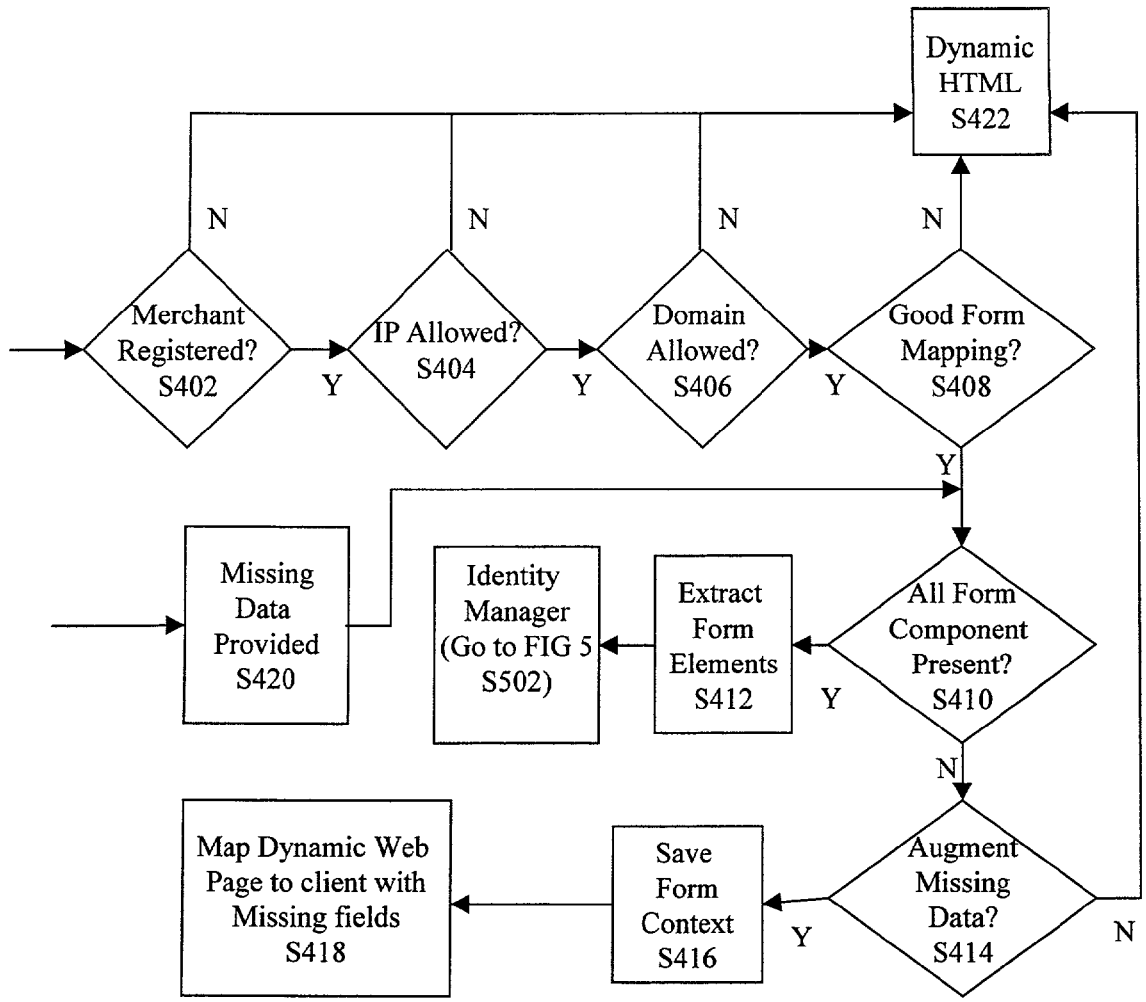

FIG. 4B is a diagram illustrating an example of the processing flow for Filter Manager 208. In one example of the invention, electronic storefronts 202 redirect payment authorization requests to PDI system 100 instead of the usual payment gateway services used to process credit card transactions. In this example of the invention, when the PDI system 100 thus receives such a request from an electronic merchant 202, the PDI web-enabled server 204 invokes the Filter Manager 208 by means of a CGI program or script. Generally, this process is the first process for user authentication, and determines the legitimacy of the PDI request for service. The Runtime Config file 402a specifies the business rules used by the Filter Manager. The PDI system 100 is preferably configured to allow or deny certain electronic storefronts from using the PDI system directly. Accordingly, as the Filter Manager 208 receives a request, the merchant domain identity is evaluated (block S402). This identity can be in the form of the HTML/CGI REFERER field as populated by the web browser 102c, or can be a specialized form element, PDI_MERCHANT, that is populated directly by the storefront prior to transmission. In either case, the merchant must identify itself to the PDI system through domain notation, or through private PDI tokens. Once the identity of the merchant site is determined, the Filter Manager 208 consults a specialized business rule file, ESITES 402f. This file lists all of the merchant domains from which PDI requests will be accepted. This allows the owner of the system to process requests only from specific storefronts that are subscribers to the user authentication services of PDI. The ESITES file also lists any special form mapping requirements or default payment gateway servers that are associated with individual storefronts directly. This will be discussed in more detail below.

In addition to filtering electronic storefront domains, the Filter Manager 208 includes functionality for filtering request data as it is associated with Internet Service Providers, or entities offering Internet connectivity. Two additional configuration files, IP.deny 402e and DOMAIN.deny 402d define those IP addresses and/or domain names whose online purchase transaction requests should not be accepted. The format of these files allow the owner of the PDI system to wildcard both domain names and IP addresses. For example, the element 192.6.* would specify any IP address beginning with the quadruples 192.6, followed by any other address elements. Likewise, domain names may be in the form *.name.com, allowing for masking at any domain level. In this latter example, *.name.com would match ip1.name.com, ip2.name.com, or name.com, since all end in the name.com notation. These files are typically populated with Internet Service Provider addresses/domains that have exhibited fraudulent activity in the past, or have been associated with online fraud in some fashion.

The IP.deny file 402e is queried first, and matched against the HTML/CGI REMOTE_ADDR field input to the CGI program as is known in the art (block S404). If a match is found, the purchase request is immediately redirected to a dynamic error page and displayed on the Client browser 102c. As a result, the purchase request will never be fulfilled. After the IP.deny file 402e is queried, the same operation is performed on the DOMAIN.deny file 402d, using data matched against the HTML/CGI REMOTE_HOST input field (block S406). As is the case with address matching, domain matching will generate the same type of dynamic error page to the Client browser 102c and stop the transaction from continuing if a match occurs.

If an incoming purchase request is not specified in either of the denial files, it may continue to the next stage of processing. Preferably, the PDI system is designed to allow easy integration with existing payment gateway services, such as CyberCash, TransAct, IPAY and many others. In order to accomplish this, a mapping between the form elements required by the gateway protocols and the electronic storefront should be established. The Filter Manager 208 process uses the existing ESITES file 402f to find any specialized mapping file which is associated with a given storefront. For example, all storefronts using the PayDirect gateway service would specify the same local mapping file, whereas Cyber-Cash-enabled storefronts would point to a different local file. The mapping files are nothing more than form element names, and their relationship to PDI form tokens. For example, merchant accounts might be specified with text such as "Estore1.com uses /filepath/paydirect.data," which indicates that an electronic storefront at domain Estore1.com uses a mapping file paydirect.data located in a /filepath directory or subdirectory.

After the Filter Manager 208 determines which localized "mapping" form file is associated with the merchant, it is read into memory (block S408). This file is a list of relationships, which determine the physical names used by the merchant to specify purchase parameters. For example, one storefront may regard a customer's first name as FNAME=<value> in specifying data to the payment gateway; others may use elements such as FIRST_NAME=<value>. The associated mapping file creates the relationship between what the merchant calls a token, and its corresponding PDI system 100 internal reference. For example, the following entry may exist within a particular mapping file: PDI_FIRST_NAME=FNAME, PDI_LAST_NAME=LNAME. This entry identifies the first name field within the form as using the FNAME token to describe it, and the LNAME form element to identify the last name of the consumer. In this fashion, the PDI system 100 can support different variations of form descriptions, regardless of the token name used to represent that element. If no mapping file is specified for a particular electronic storefront, the Filter Manager 208 system reads default form tokens from the Default Registration File 402g.

If the Filter Manager 208 in block S408 finds a valid form-mapping file, then transaction processing can continue. If, however, a mapping relationship cannot be established between the merchant form and the internal PDI tokens, a dynamic error page is created and sent to the Client browser 102c. This error message can instruct the consumer to contact the merchant site for additional support, since its protocol to the PDI system 100 is not properly supported.

After the Filter Manager 208 performs token translation, a check is made to ensure that all required form elements are actually present (block S410). The PDI system 100 requires that a minimum set of identity parameters be specified in any purchase request, so that the consumer's registration record can be retrieved. These fields can include the consumer's first name, last name, billing address, street, city, state, etc. If any of these form elements are missing, the business rules of the system determine the next course of action, as will become apparent below.

If the PDI system 100 is configured by business rules to augment missing form elements (determined in block S414), then it dynamically creates an HTML page 404a, which lists and requests those missing identity form elements from the consumer. The form elements which are given in the original request are made part of the dynamic HTML page in the form of hidden elements, so that resubmission of the form by the Client browser 102c contains all identity elements (new plus previous) (block S416). The customer is then requested to supply the missing elements (block S418). Receipt of the missing data is redirected back to the PDI system 1100 for processing (block S420). If the PDI system 100 is configured by business rules to not augment missing fields, a dynamic HTML error page is constructed and returned to the Client browser 102c, indicating that the transaction cannot proceed (block S422).

Once all form elements are present (determined in block S410), then they are parsed into their separate token/value pairs and stored in memory (block S412). This data becomes the input to the Identity Manager 210 process S502.

Figure 5A:
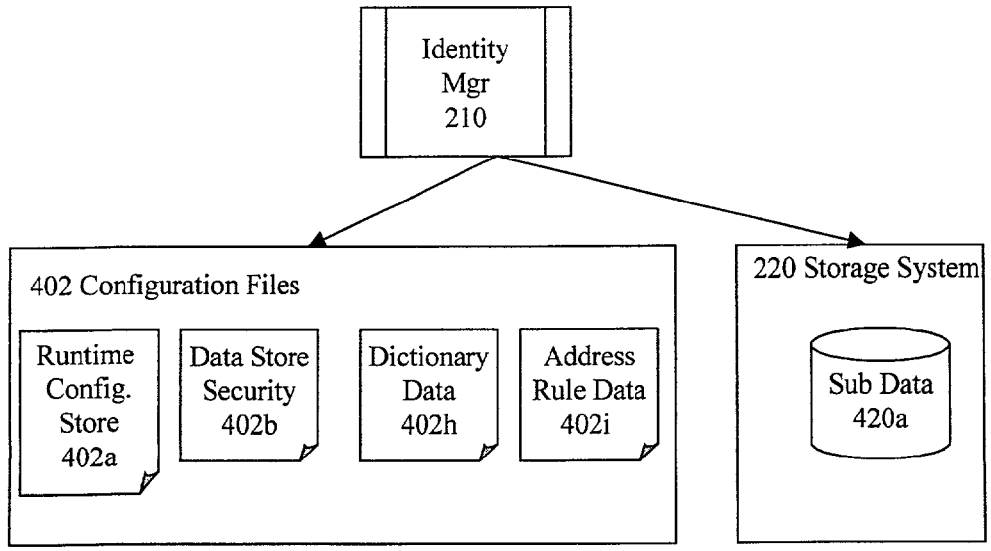
FIGS. 5A-5B further illustrate an example of the Identity Manager Process.

FIG. 5A outlines components that comprise, or are accessed by, the Identity Manger 210. Generally, the Identity Manager service is responsible for ensuring that a consumer has been PDI registered and is properly enrolled within the PDI System 100, and retrieves consumer context for downstream processing. As shown in FIG. 5A, several configuration files 402 are accessed during processing by the Identity Manager 210. As will be described in more detail below, the contents of these files determine this manager's business rules and configuration (Runtime Configuration Data 402a), Data Storage 220 access methods (Data Store Security 402b), and rules and procedures for data transformation and standardization (Dictionary Data 402h and Address Rule Data 402i).

Figure 5B:
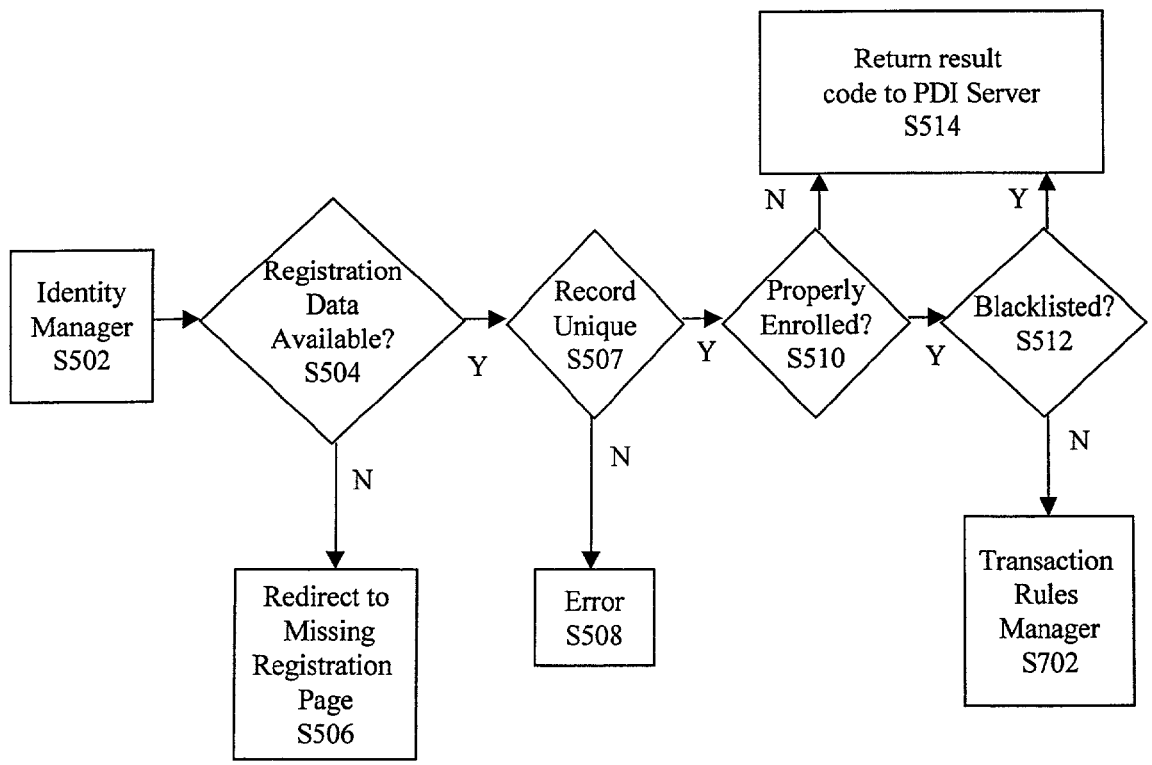

FIG. 5B is a diagram illustrating an example of the processing flow for Identity Manager 210. In the present example, the Identity Manager 210 is entered after the Filter Manager 208 has extracted and parsed identifying data related to the current transaction (block S502). The Identity Manager 210 first utilizes this data to determine if sufficient information is available to accurately identify the consumer (block S504). If sufficient information is not available, the request is redirected to a Missing Registration HTML Page (block S506) that allows the consumer to augment and provide required data. If the missing information is due to the consumer not being registered with the system (or not having sufficient registration information), the client browser may be alternatively directed to a system registration process (see block S602 in FIG. 6).

If the request and extracted data contain all of the components required by the PDI System 100 for identity verification (determined in block S504), the rules and procedures for data transformation and standardization found in the Dictionary Data 402h and the Address Rule Data 402i are utilized to create an appropriate Subscriber Data 420a query. The appropriate query is then invoked against the Subscriber Data 420a within the Storage System 220 to retrieve the "represented" consumer's record and associated template. If the query in block S507 fails, a dynamically augmented rendering of a system configured Error page S508 is returned to the Client 102.

If a unique registration entry is found in block S507, then a determination is made as to whether the consumer has previously and successfully registered (PDI_REGISTERED), which indicates that either an administrator via Administrative Services component 218 pre-registered the individual, or that the individual has attempted registration previously via that or another process. The process then determines if the consumer is properly enrolled within the PDI System 100 (block S510). "Properly enrolled" implies that the consumer has a registered DigitalCode and/or biometric template for authentication comparison. If the consumer is not properly enrolled with the PDI System 100, the request is redirected to the PDI web-enabled Server 204 with appropriate result code. If the consumer is properly enrolled as determined in block S510, and required templates are available, the Identity Manager 210 then determines whether the consumer is Blacklisted (block S512). The Blacklist contains a list of consumers whose transactions/requests are to be immediately denied by the PDI system 100. If the consumer information exists in the PDI Blacklist then the appropriate result code (DENY) is returned to PDI web-enabled server 204 to take appropriate action. If the consumer information is not contained on the PDI Blacklist then the request is forwarded to the Transaction Rules Manager for further processing and authentication determination (see block S702 in FIG. 7B).

Figure 6:
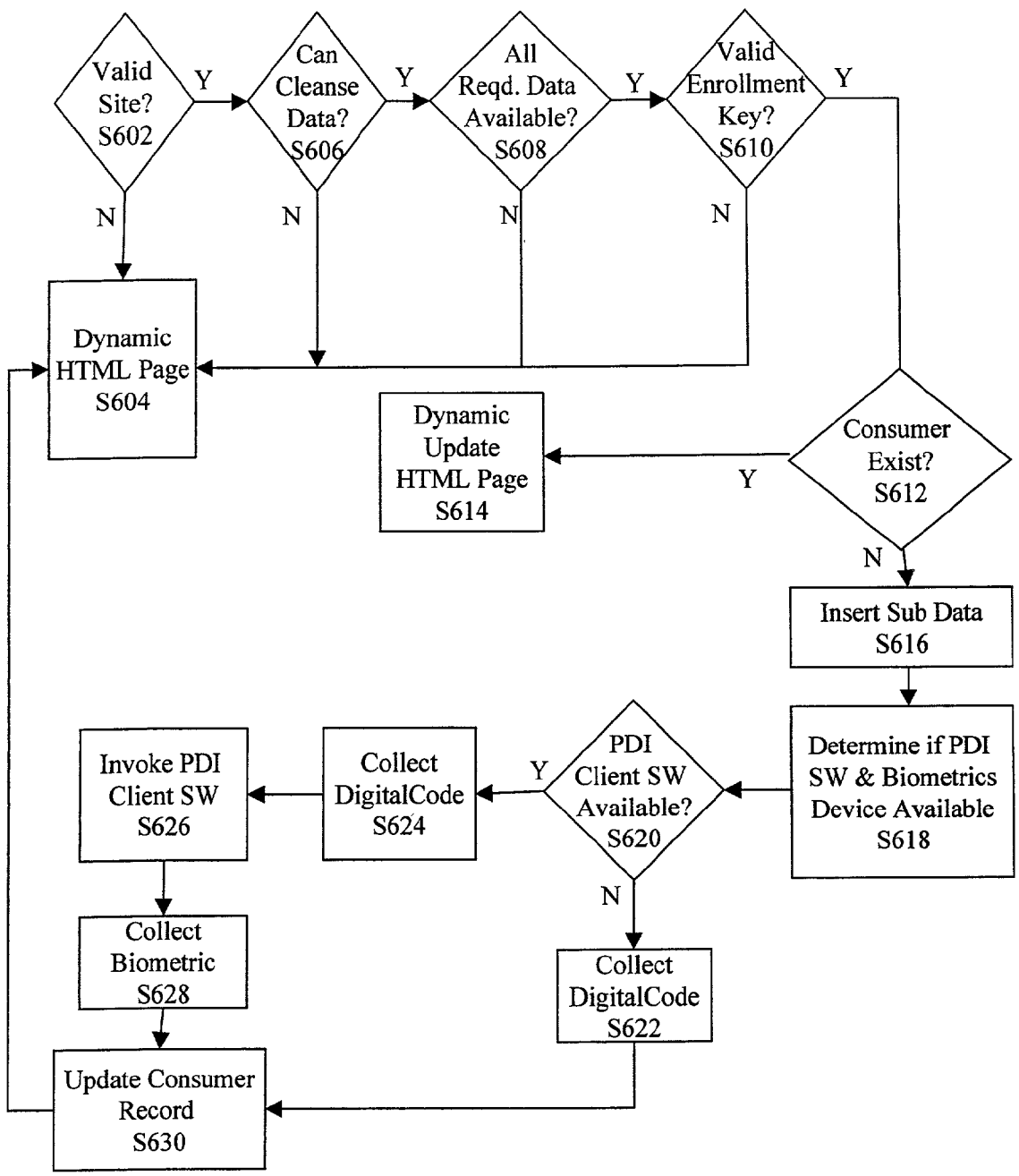
FIG. 6 provides a flowchart illustrating an example of a Registration Process.

FIG. 6 is a diagram illustrating an example of the flow of processing for the Registration Process within the PDI System. In one example of the invention, by way of the client web browser 102c, the consumer submits required form data to an Electronic Storefront 202 for the purchase of goods and authorization by the Credit Payment Network 206. The request and form data are forwarded to the PDI web-enabled Server 204. The PDI web-enabled Server 204 then determines if templates exist for the consumer by way of the Identity Manager 210 before further processing is conducted against the request. If the Identity Manager cannot locate consumer personal information and/or templates for the current request, the consumer is redirected to a Registration Page if so configured by the business rules of the system, thus initiating the registration process described below.

As shown in FIG. 6, PDI System 100 first determines if the request is submitted from a valid electronic storefront 202 (block S602). If PDI system 100 cannot validate the site, the consumer is redirected to a Dynamic HTML Page so alerting the consumer (block S604). If the request is submitted from a valid site (determined in block S602), the request and form data are then cleansed for PDI Processing (block S606), ensuring that all of the form data that is provided by the client can be reformatted to a standard format used by the PDI system. For example, "123 Main Street and 123 Main St. are the same address which would be cleansed to "123 Main St." by the PDI system 100. Once the form data is extracted, the corresponding session must be located and read. If the form data submitted by the consumer could not be mapped and cleansed (determined in block S606), the consumer is redirected to a Dynamic HTML Page (block S604). If the form data are properly cleansed and mapped, the PDI System then determines if all required components are available within the form data (block S608). If required components are missing, the consumer is advised and requested to submit those form data by way of a Dynamic HTML Page (block S604). If the request and form data contain all required components for PDI Processing, then the PDI system uses an Enrollment Key, e.g. a unique string of characters sent to an individual, to determine which consumers are authorized to register within the system (block S610). The Enrollment Key identifies the consumer as a legitimate participant of the PDI system 100 and can be sent via e-mail, regular mail, and/or other acceptable means that ensure that the Enrollment Key is not compromised. If the Enrollment Key provided by the consumer is not valid, the client 102 is redirected to a Dynamic HTML Page (block S604). If the Enrollment Key is validated in block S610 by the PDI system 100, the system continues processing the request by way of the Registration Process.

Once all required components are deemed available (block S608) and a Valid Enrollment Key has been provided (block S610), the PDI system 100 then determines if the consumer exists within the PDI system 100 using submitted form data (block S612). If the consumer exists within the PDI system 100, the consumer is redirected to an Update Personal Options page (block S614), which page allows the registered consumer to Update, Add, and/or change personal information that is stored within the Data Storage Subsystem 220.

If the consumer does not exist within the PDI system 100 as determined in block S612, the form data that is associated with the request is inserted into the PDI System 100 (block S616) and the Registration Process continues. After the newly collected consumer information is inserted into the PDI System 100, the process determines if the client 102 is equipped with the PDI Client Software 102d (block S618). If the PDI Client Software 102c is not available, the consumer is requested to provide a Digital Code (block S622) that will be updated to the consumer record for future authentication (block S630).

If the PDI Client Software 102c is available as determined in block S620, the consumer is prompted to enter a Digital Code (block S624) (e.g. a secret word or pass-phrase that an individual uses to gain access or admittance to a computer and/or information), and after successful collection of the Digital Code, the process invokes the PDI Client Software (block S626), in order to collect the biometric template from the consumer. The consumer provides the biometric template by way of the Biometric Collection Device 102b in block S628. After the Digital Code and biometric template have been successfully collected from the consumer and verified for accuracy, the consumer record is updated (block S630). After the PDI System 100 updates the consumer record, the request is redirected to a Dynamic HTML page (block S604), as configured by the business rules of the system.

Figure 7A:
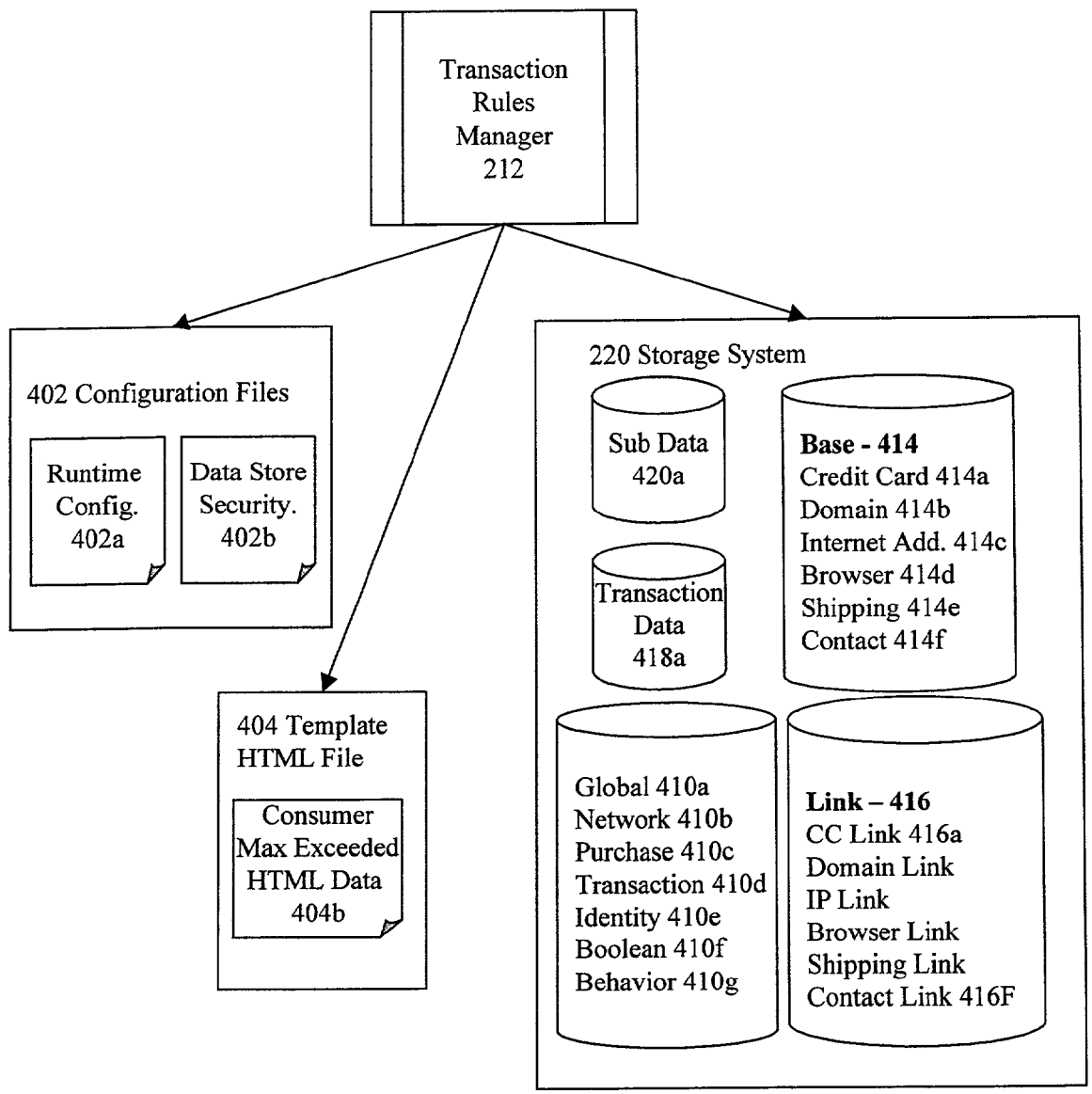
FIGS. 7A-7C further illustrate an example of the Transaction Rules Manager Process.

FIG. 7A illustrates the high-level data components utilized by the Transaction Rules Manager 212 according to one example of the invention. Generally, the Transaction Rules Manager 212 is responsible for processing the client's request against company level (i.e. business) rules to determine if authentication is required and, if so, what type of authentication should be requested of the consumer. As shown in FIG. 7A, several configuration files 402 are used during processing by the Transaction Rules Manager 212. As will be described in more detail below, the contents of these files determine this manager's business rules and configuration (Runtime Configuration Data 402a), Data Storage 220 access methods (Data Store Security 402b), HTML templates for dynamic rendering of error notifications (Template HTML File 404), and associated subscriber (Sub Data 420a), transaction (Transaction Data 418a), base (Base 414), link (Link 416) and rule (Active Rules 410a-g) data stores within the Storage System 220.

Figure 7B:
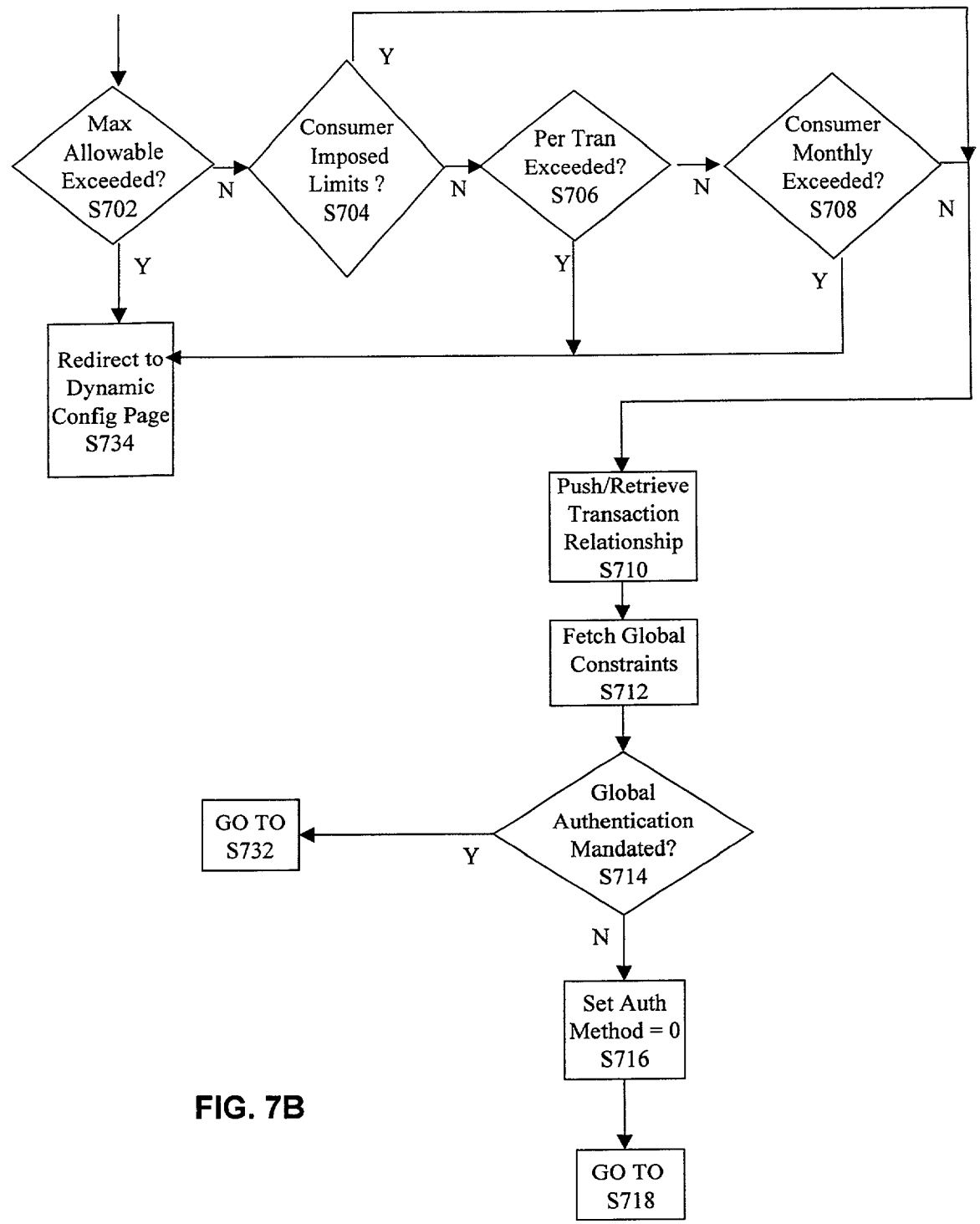

FIG. 7B is a diagram illustrating an example of the processing flow for Transaction Rules Manager 212. As shown in FIG. 7B, upon entry, the monetary amount of the current transaction is checked against the configurable System Maximum Allowable Amount (block S702). If the Monetary Amount exceeds the System Maximum Allowable Amount, then a redirection request to a configurable dynamic web page is returned to the Client 102 via the PDI web-enabled server 204 (block S734). If the Transaction Monetary Amount does not exceed the System Maximum Allowable Amount, then processing continues by checking whether Consumer Imposed Registration Limits exist (block S704).

If Consumer Imposed Registration Limits do not exist, then processing proceeds to Push and/or Retrieve Transaction Relationship (block S710). If the Consumer Imposed Registration Limits exist, then the monetary amount of the current transaction is tested (block S706), and if it exceeds the Per Transaction Limit, then a redirection request to a configurable dynamic web page is returned to the Client 102 via the PDI web-enabled server 204 (block S734). If the Per Transaction Limit is not exceeded, then processing continues by checking whether the Consumer Monthly Limit is exceeded (block S708).

If the monetary amount of the current transaction plus the monetary amount aggregate of the current month's transactions exceed the Consumer Monthly limit, then a redirection request to a configurable dynamic web page is returned to the Client 102 via the PDI Web-enabled Server 204 (block S734); else processing continues to Push and/or Retrieve Transaction Relationship (block S710).

The Push and/or Retrieve Transaction Relationship block S710 stores linkage associated relationships from the current transaction into, and retrieves historical linkage associated relationships from, the Data Storage Subsystem 220. These relationships are used throughout the remainder of the Transaction Rules Manager activities blocks S712-S730.

After the relationships have been retrieved from the Data Storage Subsystem 220 (block S710), Global Constraints are then retrieved from the Data Storage Subsystem 220 (block S712). The Global Constraints are then examined to determine if a Global Authentication Method is mandated (block S714). If mandated, then processing flows to PDI Authentication Determined block S732; if not, then processing continues by setting the authentication method to PDI_AUTH_NONE (block S716) before proceeding to evaluate Network Constraints (block S718).

Figure 7C:
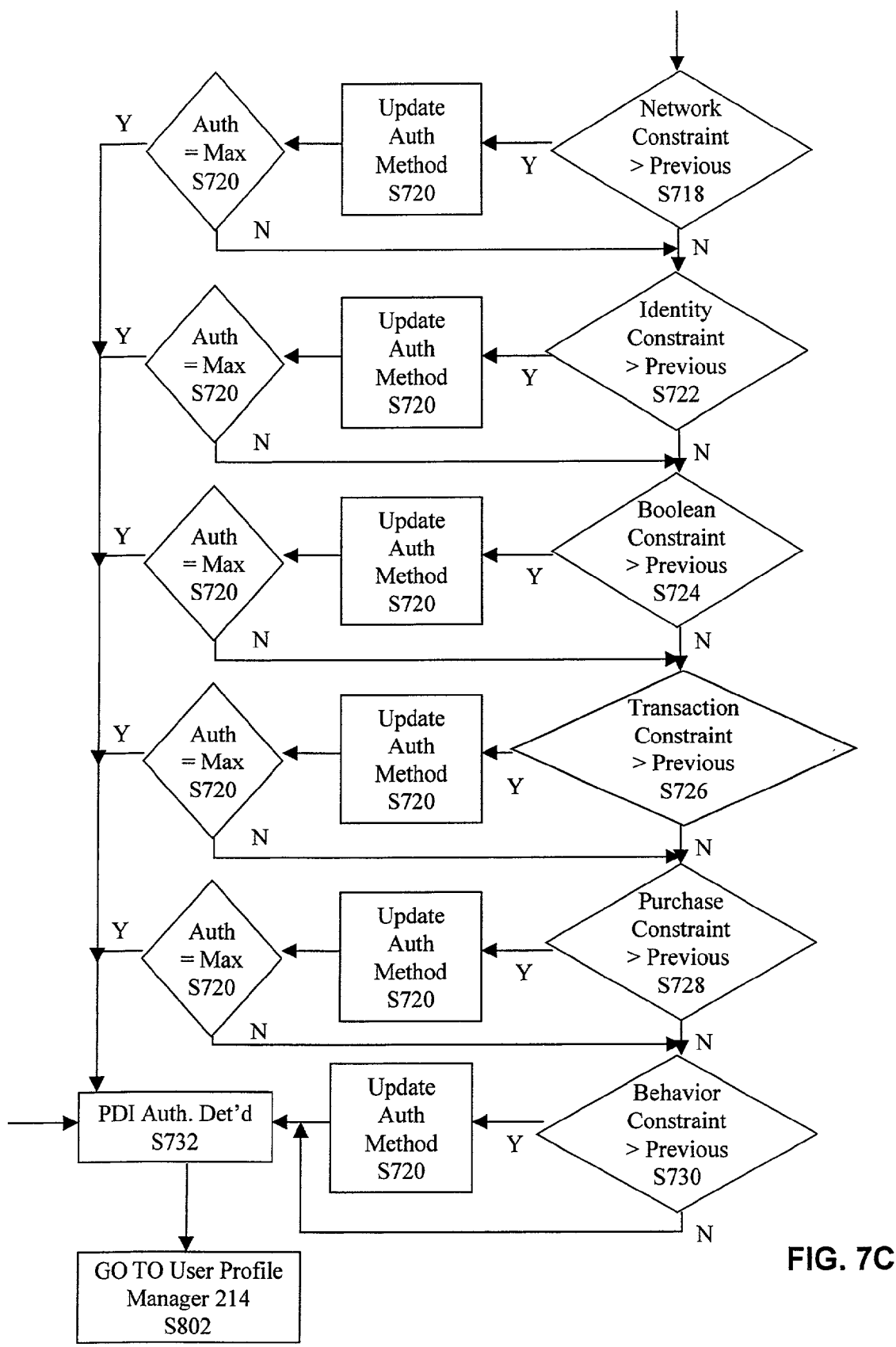

As shown in FIG. 7C, Network Constraints are evaluated in block S718 by retrieving the associated constraint vectors from the Data Storage Subsystem 220. If the current transaction matches the logic of one of the constraint vectors, then the associated authentication method is selected, and if more strict than the current authentication method, the current authentication method is updated (block S720). If the current authentication method was updated and now equals the maximum authentication available, then flow proceeds directly to PDI Authentication Determined (block S732); else flow continues by evaluating Identity Constraints (block S722).

Identity Constraints are evaluated by retrieving the associated constraint vectors from the Data Storage Subsystem 220 (block S722). If the current transaction matches the logic of one of the constraint vectors, then the associated authentication method is selected, and if more strict than the current authentication method, the current authentication method is updated (block S720). If the current authentication method was updated and now equals the maximum authentication available, then flow proceeds directly to PDI Authentication Determined (block S732); else flow continues by evaluating Boolean Constraints (block S724).

Boolean Constraints are evaluated by retrieving the associated constraint vectors from the Data Storage Subsystem 220 (block S724). If the current transaction matches the logic of one of the constraint vectors, then the associated authentication method is selected, and if more strict than the current authentication method, the current authentication method is updated (block S720). If the current authentication method was updated and now equals the maximum authentication available, then flow proceeds directly to PDI Authentication Determined (block S732); else flow continues by evaluating Transaction Constraints (block S726).

Transaction Constraints are evaluated by retrieving the associated constraint vectors from the Data Storage Subsystem 220 (block S726). If the current transaction matches the logic of one of the constraint vectors, then the associated authentication method is selected, and if more strict than the current authentication method, the current authentication method is updated (block S720). If the current authentication method was updated and now equals the maximum authentication available, then flow proceeds directly to PDI Authentication Determined (block S732); else flow continues by evaluating Purchase Constraints (block S728).

Purchase Constraints are evaluated by retrieving the associated constraint vectors from the Data Storage Subsystem 220 (block S728). If the current transaction matches the logic of one of the constraint vectors, then the associated authentication method is selected, and if more strict than the current authentication method, the current authentication method is updated (block S720). If the current authentication method was updated and now equals the maximum authentication available, then flow proceeds directly to PDI Authentication Determined (block S732); else flow continues to Behavior Constraints (block S730).

Behavior Constraints are evaluated by retrieving the associated constraint vectors from the Data Storage Subsystem 220 (block S730). If the current transaction matches the logic of one of the constraint vectors, then the associated authentication method is selected, and if more strict than the current authentication method, the current authentication method is updated. Flow continues to PDI Authentication Determined (block S732).

Once PDI Authentication has been determined S732, flow continues to the User Profile Manager 214.

Figure 8A:
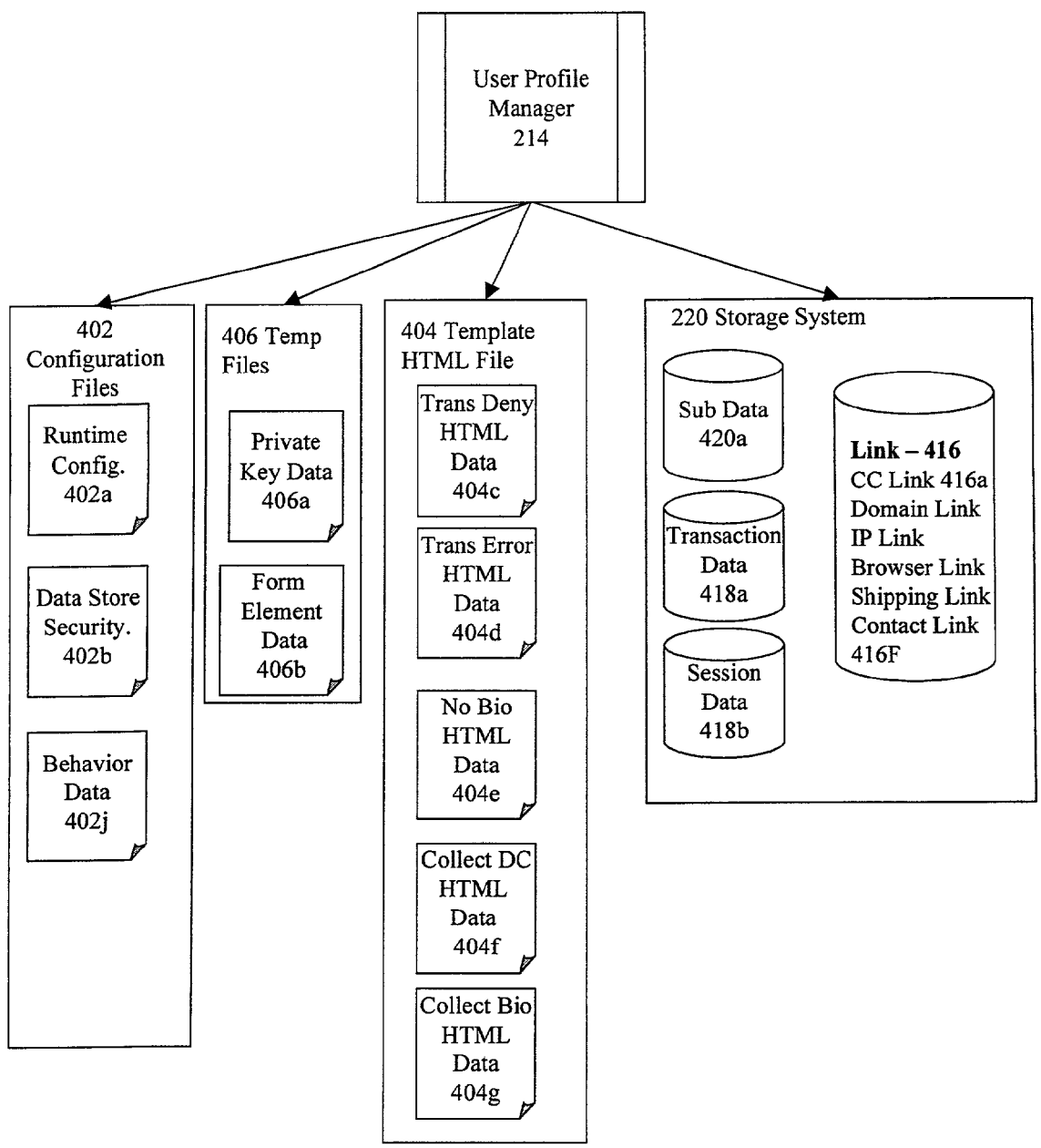
FIGS. 8A-8C further illustrate an example of the User Profile Manager Process.

FIG. 8A illustrates the high-level data components utilized by the User Profile Manager 214 according to one example of the invention. As shown in FIG. 8A, User Profile Manager 214 accesses several configuration/parameter files during processing. As will be explained in more detail below, these files establish the business rules of the PDI system 100, and determine which (and how) transactions will be processed by PDI. Temporary files are used to store transaction form data, until the necessary user authentication has been validated by the system. Encryption keys are also stored in temporary storage areas, since they are valid for a single session only. In addition, template HTML files may be used to construct error messages, or information collection messages back to the Client browser 102c as necessary. Data storage is handled by a series of database tables, which access profiling information, store transaction elements and create linkage relationships between the current transaction and its associated network elements.

Figure 8B:
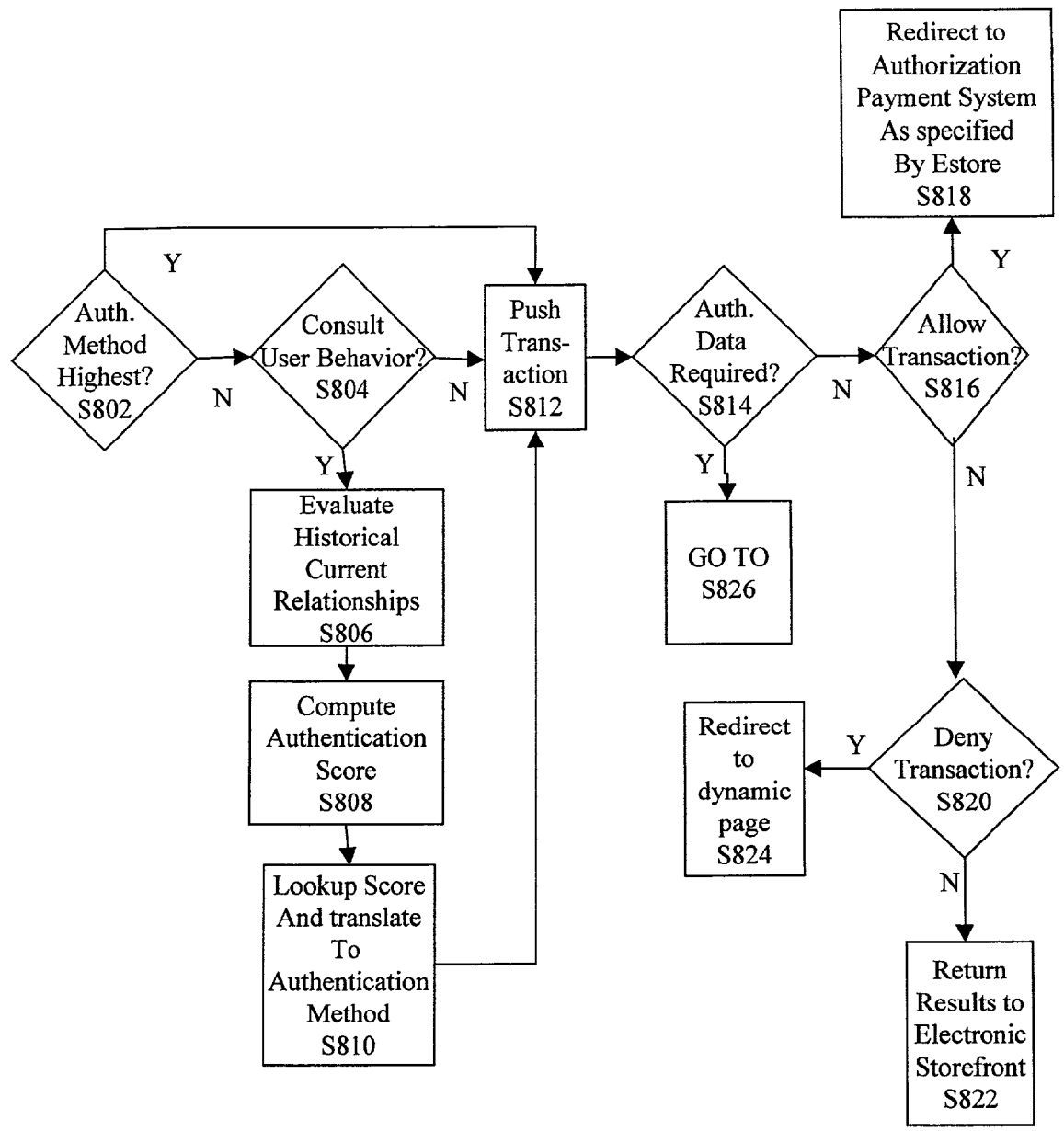

FIG. 8B is a diagram illustrating an example of the processing flow of User Profile Manager 214 within the system architecture of the present invention. Generally, this subsystem is responsible for evaluating the current transaction for authentication needs, by using behavioral-based profiling algorithms as described below. In the present example, input to the User Profile Manager 214 is in the form of a previously evaluated user authentication method to be applied to the current transaction, as determined by the Transaction Rules Manager 212.

Authentication inputs received from the Transaction Rules Manager 212 may be, for example, any of the following identifiers: PDI_AUTH_NONE, identifying that no matching rules were evaluated in prior steps; PDI_AUTH_ALLOW, indicating that the transaction should be allowed without further evaluation; PDI_AUTH_DC, indicating that a DigitalCode should be used to authenticate the individual; PDI_AUTH_BEST, indicating that the best method available on the Client 102 should be used, depending upon availability of the Biometric Collection Device 102b; PDI_AUTH_FP, indicating that a biometric fingerprint should be used to authenticate the individual; PDI_AUTH_FP_DC, indicating that both a DigitalCode and biometric fingerprint should be used to authenticate the individual; and finally, PDI_AUTH_DENY, indicating that the transaction should be denied completely.

The business rules of the PDI system 100 determine whether or not behavioral-based processing should proceed, even when an authentication method is directly specified by the Transaction Rules Manager 212. Business rules for the system are defined by the Runtime Config File 402a, which identify the runtime parameters that are applied during transaction analysis. If it is determined that the specified authentication method currently input is the highest level available (namely, PDI_AUTH_DENY), no additional processing occurs, since behavioral-based evaluation would be unable to supersede the method previously input (block S802). If, however, business rules dictate that behavioral-based profile processing should be applied in conjunction with input authentication methods, or, if no authentication method was previously determined (PDI_AUTH_NONE), then profiling algorithms are deployed (block S804).

The evaluation of historical transaction relationships for the individual subscriber is extracted from the linkage tables of the PDI system 100, where they are evaluated (block S806). The User Profile Manager 214 maintains a unique relationship between all network elements that comprise a transaction, and associates this data directly to the individual requesting that transaction. Access to these relationships is through the Data Store Security File 402b, which defines the security access parameters to the Data Storage System 220.

The PDI system 100 is preferably designed to allow the addition or deletion of network elements, depending upon the deployment environment. In the case of electronic commerce transactions, network elements are maintained on a per-individual basis, and an occurrence count is incremented each time a transaction isolates the usage of an identifiable network element. In addition, for each element the system maintains a historical count of the number of times the element has been successfully authenticated, as well as the number of times that element is associated with a transaction whose authentication request has failed. In this fashion, each individual network element has its own "score" maintained in an atomic fashion, depending upon previous authentication attempts. As more transactions are processed for a particular individual's purchase requests, the authenticity of a given element as associated with that individual is bolstered.

For example, the use of an IP address by an individual five times would cause a count of both successes and failures totaling five to be maintained by the system. The distribution of the success versus failure counts indicates the current score of the individual network element for that individual's previous purchase patterns. In the case of an individual who has used IP address 206.168.56.5 five times in the past, a distribution of a success count of four times and failure count of one time (totaling five) would be scored as 4/5*100=80%. As a result, the IP address linkage for the individual using 206.168.56.5 indicates that 80% of the time in the past, successful authentication has occurred when transactions originated from this service provider address.

Network elements, as used herein, include such components as IP address, electronic storefront domain name, shipping address, contact information, browser software, credit card information, transaction amount, time-of-day, and day-of-week, etc. This list is intended as illustrative rather than limiting and other components will be apparent to those skilled in the art. Network elements are stored in the Data Storage Subsystem 220, and are associated directly with the subscriber identity record. Each of these vectors has direct linkage relationship with the individual consumer's registration data, and historical usage counts (occurrences, successes, failures) are maintained for each network element used by the consumer in the past. In this fashion, the profiling algorithms of the PDI system 100 are able to evaluate the usage score of each network element as it pertains to the individual, and compute aggregate scores based upon the combination of all network elements seen in the current transaction.

In order to allow administrators of the PDI system 100 to customize the manner in which scores are computed for any given transaction, each network element has an associated weight constant that is applied during analysis. This weight is defined in the business rules configuration file, and determines what "strength" should be applied to all network elements within the system. In this fashion, system administrators can determine which transaction components should be regarded as more important within the target environment, based upon historical fraud patterns or availability of certain components in general.

As each network element of the current transaction is evaluated and weighted, an aggregate score is computed based upon historical authentication patterns of the target individual consumer. This score represents the overall historical authentication certainty as it pertains to an aggregation of network elements associated with the claimed individual. In general terms, the final score is computed by comparing the total number of times a given network element has been successfully authenticated, and dividing that value by the total number of attempts to that network element. This in turn, yields an authentication percentage. Each network element is multiplied by the weight value assigned to that element, to determine the overall score for the particular element. The summation of all these scores is then divided by the sum of the weights. The final score is a percentage, in the range of 0-100.

Upon completion of this process (block S808), the authentication score is compared to the business rules established by administrators of the PDI system 100. These business rules specify threshold values that pertain to specific authentication methods to apply. For example, the business rules of the system may specify that scores between 80% and 85% should require the given transaction to authenticated by means of a Digital Code. This information is retrieved from the Behavior Data file 402j.

The resultant authentication method returned from behavioral-based processing, as outlined above, is compared to the input authentication method specified by the Transaction Rules Manager 212. The more stringent of the two authentication methods is identified, and becomes the preferred authentication method to apply to the current transaction (block S810).

Upon completion of authentication method analysis, the current transaction is inserted into the Data Storage Subsystem 220 (block S812). At this point in the process, the transaction status is identified, based upon what user interaction is required between the PDI system 100 and the Client 102 machine. Transactions that require no interaction, namely, PDI_AUTH_ALLOW or PDI_AUTH_DENY are regarded as being completed in nature, since no authentication credentials are required. All other transactions, namely PDI_AUTH_BEST, PDI_AUTH_FP, PDI_AUTH_DC and PDI_AUTH_FP DC require input from the individual in order to verify user identity. These transactions are marked as incomplete in nature since status has not yet been determined, and authentication credentials not yet collected. Each and every transaction in the PDI system 100 is saved, and the associated authentication method, completion status, linkage to network components and reason for authentication is made part of the transaction entry.

As described above, certain authentication methods require interaction between the PDI system 100 and the Client 102, for the purpose of collecting identity credentials. An evaluation is made to determine if such an interaction is required (block S814), based upon the identified authentication steps outlined in blocks S802 and S804. The collection of biometric data, Digital Codes, or the combination of the two is regarded as an interactive process. If, however, the authentication method is a PDI_AUTH_ALLOW (as determined in block S816), no identity collection is required, and the transaction is immediately forwarded to the credit payment system or external entity as specified by the electronic storefront (block S818). All purchase form data, as originally presented to the PDI System 100, and stored in temporary Form Element Data Files 406b, is forwarded unaltered. In this scenario, the PDI System 100 is merely a pass-through subsystem and appears transparent to the electronic commerce purchase transaction.

If, on the other hand, the authentication method is a PDI_AUTH_DENY (determined in block S820), a denial message is immediately returned to the electronic storefront and no further processing is performed (block S822). The business rules of the system determine if a response code is generated for return to the electronic storefront, of if another URL is invoked instead. If, however, the final path for a non-interactive authentication method is not the result of a deny or accept transaction condition, this indicates that a programmatic problem has occurred within the PDI System 100. The consumer is thus redirected to an error page by the Client browser 102c (block S824).

As indicated previously, certain authentication methods require interaction with the consumer. When such an authentication method is specified (determined in block S814), a determination is made as to which URL will be mapped to the Client browser 102c system for collecting identity credentials.

Figure 8C:
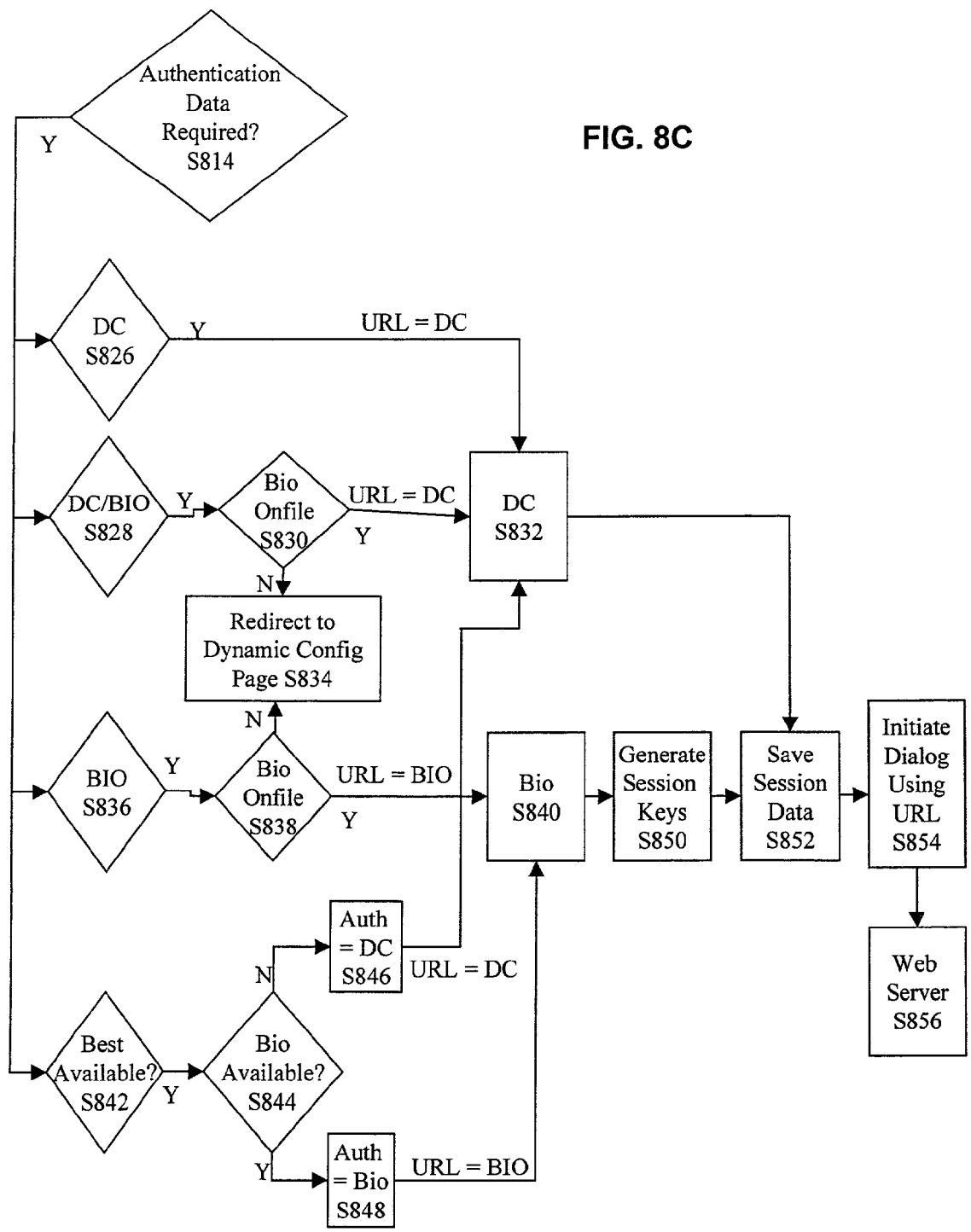

Turning now to FIG. 8C, therefore, if PDI_AUTH_DC is specified (determined in block S826), then the target URL for collecting identity credentials is marked as DC, specifying Digital Code collection (block S832). A Digital Code will always be on file for a consumer, since the PDI Registration Process described above will not allow a registration record to be inserted into the Data Storage Subsystem 220 unless a valid Digital Code is collected and verified.

If PDI_AUTH_FP_DC is specified (determined in block S828), then a combination of Digital Code and biometric data is to be requested. In order to ensure that this type of authentication is valid, the consumer's registration record is queried to determine if a biometric template is on file (block S830). If such a template is found, the target URL for collecting identity credentials is marked DC (block S832), since Digital Code collection will occur first when multiple credential collections are specified. If, however, a biometric template is not on file for the consumer, a redirection occurs for the purchase request, since authentication cannot be completed due to lack of biometric registration data (block S834). The business rules of the system determine the location of this URL redirection.

The same process is applied to PDI_AUTH_FP (as determined in block S836); if biometric authentication is required, the consumer's registration record is queried to determine if a template exists (block S838). If such a template is found, the target URL for collecting identity credentials is marked as BIO (block S840). As in the PDI_AUTH_FP_DC example, if no biometric template is available, the PDI system 100 redirects the purchase request to the appropriate URL as determined by system business rules (block S834).

Finally, if PDI_AUTH_BEST is specified (determined in block S842), a check is made to determine if a biometric template is available for the consumer (block S844). However, lack of such a template does not generate an error redirection. Rather, if Digital Code is the only information on file for the consumer (block S846), then the target URL for collecting identity information is marked as DC (block S832). On the other hand, if a biometric template is available (block S848), then the target URL is marked as BIO (block S840).

Upon completion of determining the appropriate URL to be mapped to the Client browser 102c for collecting identity credentials, session keys are preferably generated for biometric authentication (block S850). Using public key cryptography (asymmetric encryption), the User Profile Manager 214 generates two keys—a public key and private key (block S850). These keys will be used to encrypt and decrypt biometric data as it is collected and returned to the PDI system 100 for transaction authentication. The size and algorithm to be used in creation of public/private key pairs is specified by the business rules of the system.

The public key generated is included in the URL data to be sent to the Client Browser 102c, so that it may be used to encrypt biometric data prior to transmission back to the PDI system 100. This is accomplished by dynamically updating the BIO URL contents, and adding the public key data as part of the plug-in input parameters. The private key on the other hand, is stored in a protected directory on the PDI system 100, and whose file name is made available to session data that is saved (block S852). This constitutes the temporary Private Key Data file 406a.

Session data 418b identifies the transaction that is currently requiring authentication, and includes details of the transaction state. The session record identifies the authentication method being applied, the IP address from which the current request originated, the date/time that the authentication request was started, the private key file name if biometric collection is occurring, the original purchase form elements sent by the electronic storefront, and the status of any retry attempts from the consumer. Each session record is assigned a unique, non-repeating key value that identifies it from all other session records within the PDI system 100. It is this key that will be used to correlate the current transaction request with authentication responses received from the Client 102 after identity credentials are collected. The session key is appended to the target URL after it is generated, and is stored in the Session Data table 418b on the PDI host.

After session data has been stored within the PDI system 100 (block S852), a dialog is initiated between the PDI web-enabled server and the Client browser 102c. The PDI system 100 redirects the consumer to the previously determined target URL, which begins the credential collection process (block S854). All transactions back to the client are through the PDI web server (block S856). At this point, control is relinquished by the PDI system 100 and the transaction request is still in an incomplete state until identity credentials are received and verified by the PDI system 100.

Figure 9A:
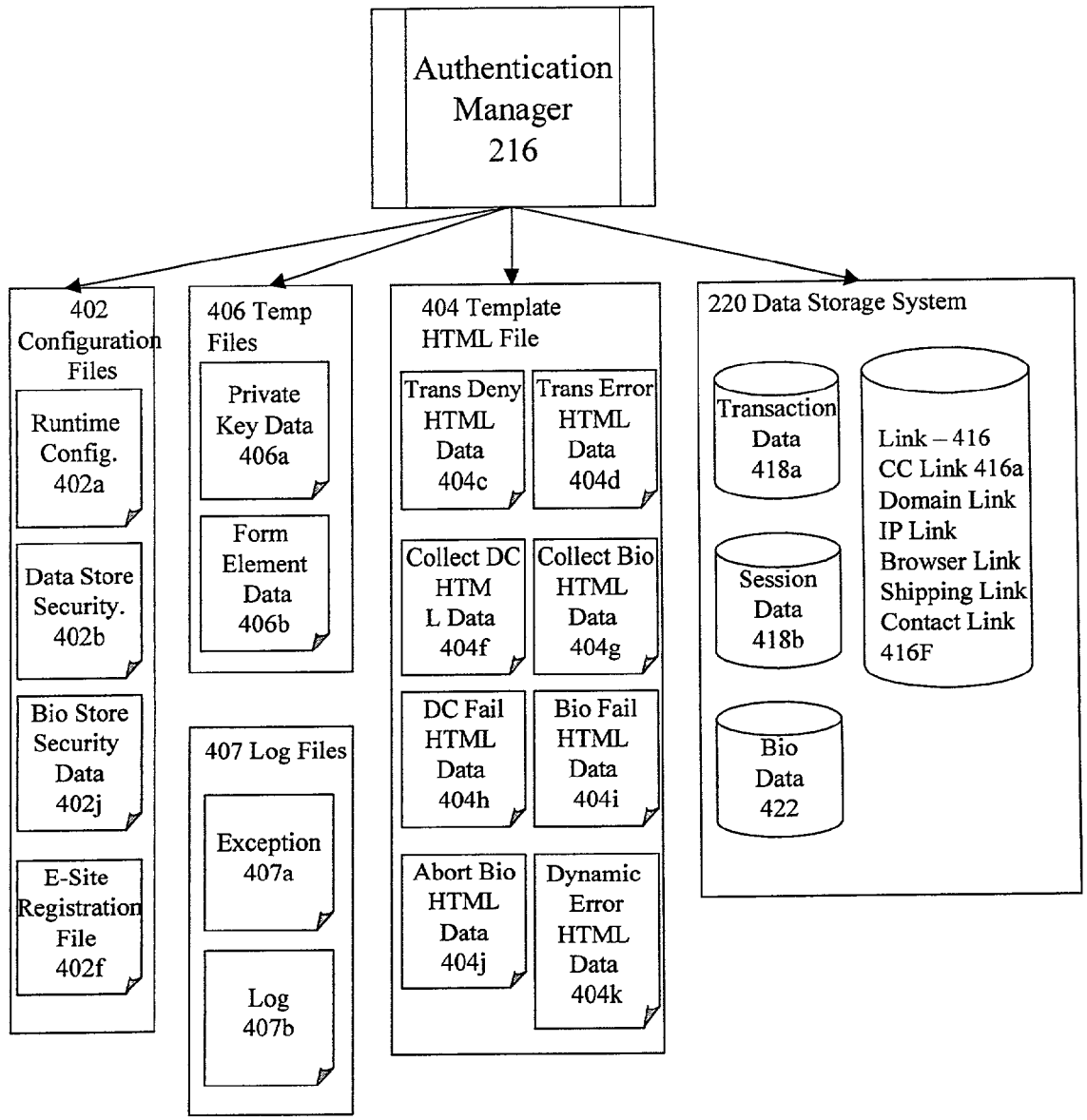
FIGS. 9A-9C further illustrate an example of the Authentication Manager Process.

FIG. 9A outlines components that comprise, or are accessed by, the Authentication Manager 216 in accordance with one example of the invention. Generally, this subsystem is responsible for validating user identity credentials that are passed to the PDI System 100 in response to authentication requests previously sent to the Client workstation 102. For example, if it is determined that a given transaction requires the submission of biometric or Digital Code data, the Client workstation 102 sends the corresponding identity responses to the Web Enabled PDI Server 204, where they are processed directly by the Authentication Manager 216.

As shown in FIG. 9A, several configuration files are used during processing by the Authentication Manager 216, which files specify the business rules of the system, and are explained in greater detail below. Generally, temporary data files 406 are used by the Authentication Manager 216 for the storage of encryption key data and form element data; log files 406 are used to record system messages, errors and processing exceptions; template HTML files 404 identify specific error pages which are mapped to the Client workstation 102 if required; and the Data Storage System 220 maintains the session, transaction, biometric and linkage information for the consumer transaction in progress.

Figure 9B:
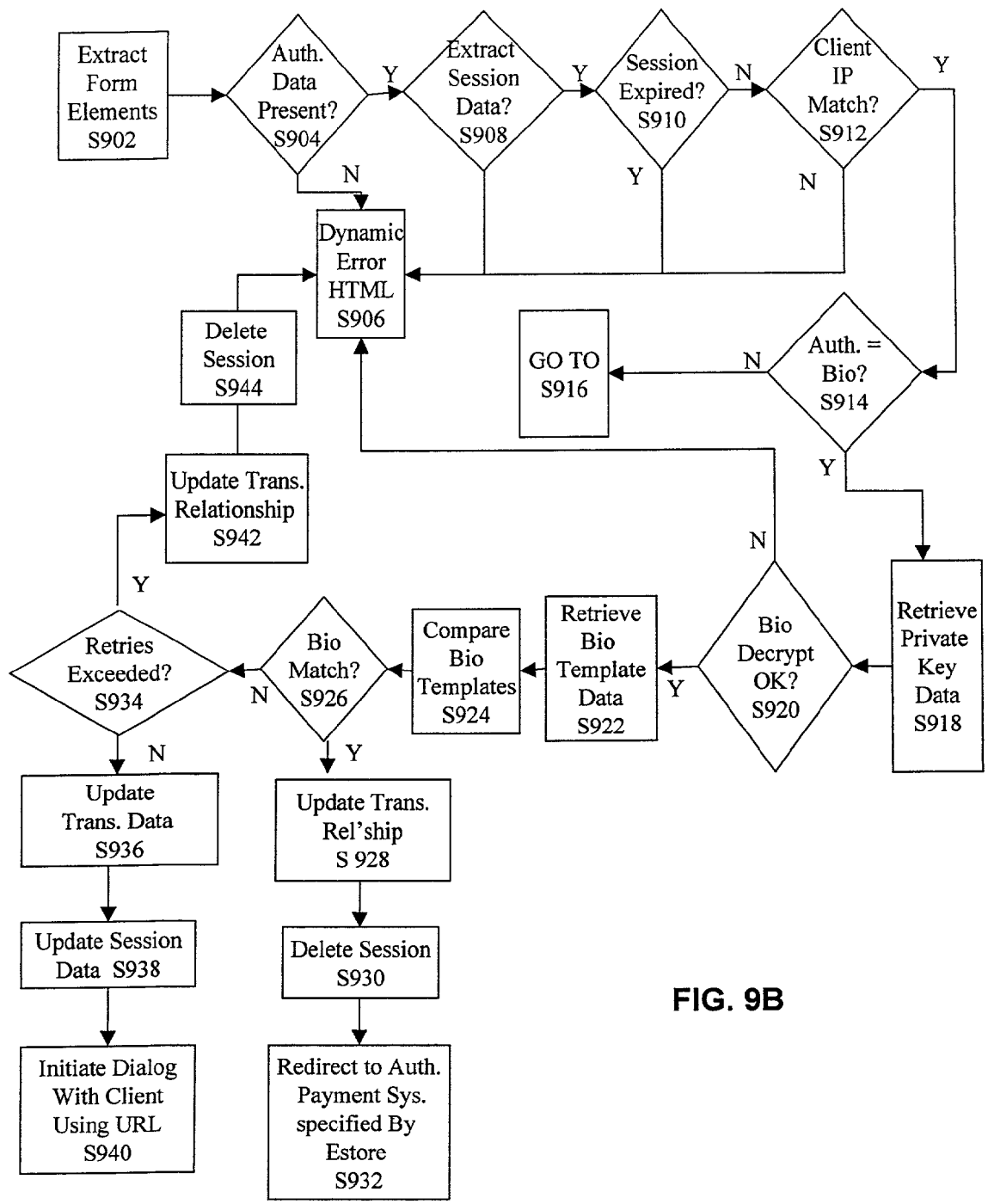

FIG. 9B is a diagram illustrating an example of the processing flow for Authentication Manager 216. As shown in FIG. 9B, upon entry, the HTML form data passed by the Client workstation 102 is extracted and parsed (block S902). This form data preferably contains predefined tokens that identify the type and value(s) of authentication information being presented, so that data availability can be determined (block S904). For example, a token such as "DC=<value>" might identify a Digital Code element, and its corresponding value. Likewise, biometric data would include the biometric stream, its byte length and the number of samples being sent, for example: BIO=<value>, BIO_LENGTH=<value>, BIO_SAMPLES=<value>.

If form data cannot be read, or the data passed to the Authentication Manager 216 is deemed corrupt or malformed, a dynamic error page is created for return to the Client workstation web browser 102*c* (block S906).

Once form data is extracted, the corresponding session must be located and read (block S908). Session data identifies a previously started electronic commerce transaction that required the receipt and validation of authentication credentials. Session information is stored by means of a hidden form element passed back and forth between the Web Enabled PDI Server 204 and the Client workstation 102, normally in the form SESSION=<value>. The session key <value> acts as the lookup mechanism for locating session information directly. If the session information can be found for the current transaction, then further processing may continue.

If session data cannot be found for the current transaction (as determined in block S908), a dynamic web page is constructed, based upon the error, and returned to the Client workstation browser 102*c* (block S906). Dynamic error page creation can be achieved by a variety of industry-available techniques, such as Active Server Pages (ASP), or through means of CGI scripts or programs.

The state of the session is then checked to determine its legitimacy (block S910). Sessions are given a finite expiration time, so that transactions must be completed in a timely manner, even when user authentication credentials are collected and evaluated by the PDI system 100. In order to prohibit cutting-and-pasting of source data to the web enabled PDI server 204, authentication responses to the system must be completed within a pre-determined period of time. The business rules of the system, as detailed in the runtime configuration file 402*a*, determine the length of this "expiration period". Transactions that have "timed-out" are redirected to dynamic web pages, which detail the error to the Client workstation 102 (block S906). A typical value for such a timeout might be in the range of 1-5 minutes, depending upon the authentication credentials normally collected. Since user authentication is interactive in nature, this value must be long enough to allow a dialog (or dialogs) to complete over networks such as the Internet, but not so long as to allow transactions to be cut-and-pasted by potential hackers.

Like session timeout validation, IP address validation is also conducted. When a session is created and stored by the User Profile Manager 216, the IP address of the original transaction is stored as part of the session data. As authentication requests are matched to their corresponding sessions, the original IP address is compared to the current IP address of the transaction. If the client IP addresses match (determined in block S912), then transaction flow is permitted to continue. If, on the other hand, the IP addresses do not match, then a dynamic web page is constructed and returned to the Client workstation 102 (block S906). As in the case of session expiration, IP address mismatching does not permit the transaction to continue. IP addresses that do not match are potential cut-and-paste operations, which may indicate an attempt to circumvent the presentation of valid user credentials. It is understood that there are multiple reasons for such an event occurring, such as client Internet service disconnects/reconnects. Regardless of the reason, IP address matching is determined by the business rules of the system, and when specified, must match exactly before transaction processing will be allowed to proceed.

Figure 9C:
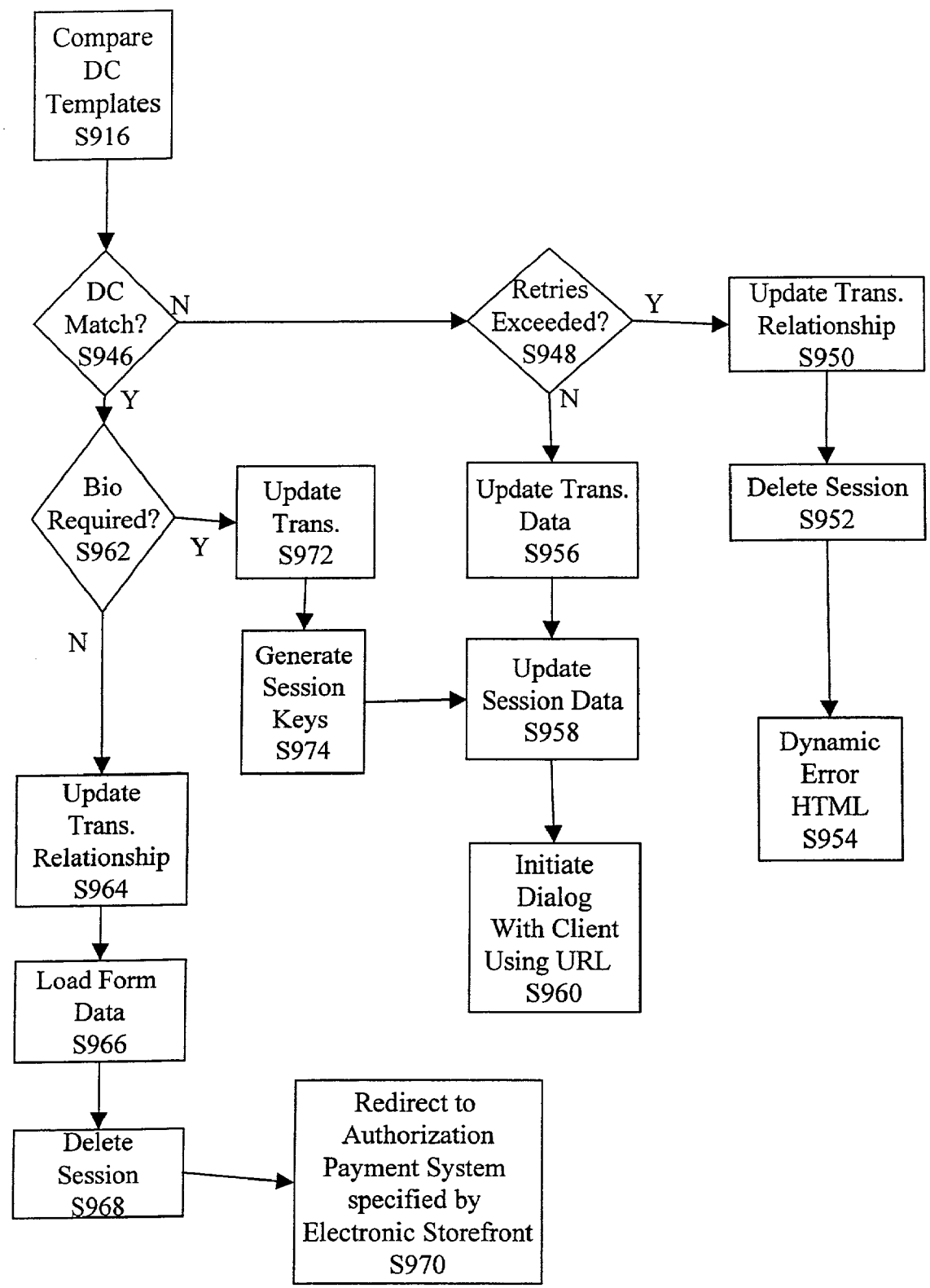

The type of user authentication is then determined by the form elements presented (determined in block S914). If the authentication contains Digital Code credentials, then a direct comparison between the presented Digital Code and the Digital Code stored as part of the user identity record is performed (block S946). As shown in FIG. 9C, if the digital codes match, then transaction processing continues, as will be described below. If, however, the Digital Code data does not match, the business rules of the system are consulted to determine the number of retries an authentication request is allowed. If the number of retries has not been exceeded (as determined in block S948), the current transaction record is updated to indicate that a failed Digital Code authentication has occurred (block S956). The corresponding session record is also updated (block S958), decrementing the number of additional attempts which will be permitted based upon the system business rules. The session timeout is also refreshed, allowing retry attempts to function as though the session were started anew (block S958). Upon completing these updates, a dialog is re-initiated between the PDI web server 204 and the Client browser 102*c* (block S960).

If, on the other hand, the number of retries has been exceeded with respect to Digital Code collection, the transaction relationships between the network elements are updated, and marked as 'authentication failures' (block S950). For example, if the current transaction has a linkage relationship to IP address 206.168.56.6, the individual subscriber's data record would be updated to indicate an incremented failure from this Internet address. This type of selected network element success/failure counting on a per-individual basis allows the User Profile Manager 216 to perform adaptive authentication profiling.

Scenarios which exceed the maximum number of retries without presenting valid Digital Code credentials will automatically delete the session record associated with the current transaction (block S952), and generate a dynamic error page to the Client browser 102*c*, indicating that the transaction could not be authenticated. As a result, the original purchase request is never routed to a payment system, thus canceling the transaction.

Upon successful matching of Digital Code credentials to registered values (block S946), processing continues to further determine if user authentication has been completed. Since the PDI system 100 allows for a combination of credentials to be collected for a single purchase request (i.e., PDI_AUTH_FP_DC), a check is first made to determine if biometric authentication is required (block S962). The session record for this transaction contains the necessary authentication method to be applied. If no additional authentication is required, the transaction relationships between the network elements are updated, and marked as "authentication successes" (block S964). As is the case for authentication failures, network element updates on a per-individual basis allows adaptive authentication to evolve and strengthen over time.

Upon successful Digital Code authentication matching, and if no further authentication is required, the final set of data is retrieved from the session record prior to its deletion. The session record maintains the location of the original form elements, as extracted by the User Profile Manager 212, and stored in a temporary file within the Data Storage Subsystem 220 (Form Elements Data File 406b). These form elements allow the Authentication Manager 216 to reconstruct the original electronic commerce purchase request, as though the PDI system 100 was never involved in the original transaction. Once this data is extracted and loaded (block S966), the associated session record is summarily deleted (block S968). A CGI script, for example, loads the form data, where it redirects the transaction to the appropriate payment system as specified by the electronic storefront originally (block S970).

If it is determined in block S902 that biometric collection is required upon receipt and validation of Digital Code, then the current transaction is updated to reflect that partial user authentication has completed (block S972). The transaction is still left in an incomplete state, pending the receipt and validation of biometric credentials. Session keys are generated for this authentication request, so that biometric encryption can be achieved (block S974). Session information is also updated, indicating that the Digital Code portion of the request has completed (block S958), and biometric credential collection is now in progress. At this point, a dialog is reinitiated between the PDI web server 204 and the Client browser 102c, asking for biometric data collection (block S960).

Returning to FIG. 9B, like the description of Digital Code collection, the type of user authentication extracted from the HTML form data may indicate that biometric data is being presented (block S914). A comparison of the presented biometric credentials, and those on file for a given consumer must then be conducted in order for transaction processing to continue. Unlike DigitalCode comparisons, however, biometric data is encrypted to protect consumer privacy. The corresponding session record that was located in block S908 identifies the location of the private key file required to decrypt the transmission. This file is the corresponding public/private asymmetric key pair that was generated when the biometric authentication request was originally initiated and is thus retrieved (block S918).

The private key file is extracted from the Data Storage System 220 and used to decrypt the BIO form element received in block S902. The status of the decryption process is evaluated in order to determine if the BIO data has been modified in transmission, or if an attempt has been made to cut-and-paste the information to the Authentication Manager 216 (block S920). Because a unique session key is generated each time a biometric authentication request is generated, only the stored private key is capable of decrypting the resultant message. Randomization ensures that the session key cannot be "guessed" by a potential hacker.

If the biometric data is deemed compromised in any way, a dynamic error message is returned to the Client browser 102, indicating that the electronic purchase transaction has been canceled (block S906). This type of error does not allow retry logic to be invoked, since the system cannot determine the legitimacy of the consumer making the transaction request.

The Authentication Manager 216 retrieves the stored biometric template for the target consumer from the appropriate biometric database (block S922). Biometric data for the consumer must have been previously registered with the PDI system 100, and must be located in a data store accessible to the Authentication Manager 216 process. The physical location of this biometric database is independent of the PDI system 100 design, since it may exist within a distributed database or file system environment. The Authentication Manager is preferably capable of making local or remote network requests to an industry-standard relational database that can be housed anywhere within the network environment.

Once the biometric template is recovered for the consumer, it is compared to the presented biometric credentials (block S924). Threshold matching for biometric data is defined by the business rules of the system, and is used to determine the certainty level acceptable to the PDI owner. Threshold matching typically is expressed as a ratio of certainty, such as 1 in 1 million or 1 in 500 (1:1000000 or 1:500). This certainty level is used to determine the pass/fail status of the biometric comparison.

If a biometric match is encountered (determined in block S926), the transaction relationships between the network elements and the consumer are updated, and marked as "authentication successes" (block S928). The form data saved for the original purchase transaction is extracted from the session data, loaded by a CGI script, and redirected to the appropriate payment system as specified by the electronic storefront originally (block S932). Prior to transmission, the session is summarily deleted (block S930).

Biometric data that does not match the consumer's template (as determined in block S926) causes retry logic similar to Digital Code authentication to be executed. A set number of retries is established by the business rules of the PDI system 100, which controls whether additional user authentication requests should be initiated. If the number of retries is exhausted (as determined in block S934), then the transaction relationships between the network elements and the consumer are updated to an "authentication failure" status (block S942), indicating that none of the transaction components could be authenticated. The session is then deleted (block S944), and a dynamic HTML page is sent to the Client browser 102c indicating that the transaction has been halted (block S906).

If the number of retries has not been exceeded (as determined in block S934), the current transaction record is updated to indicate that a failed biometric authentication has occurred (block S936). The corresponding session record is also updated, decrementing the number of additional attempts which will be permitted based upon the system business rules (block S938). The session timeout is also refreshed, allowing retry attempts to function as though the session were started anew. Upon completing these updates, a dialog is re-initiated between the PDI web server 204 and the Client browser 102c (block S940).

Figure 10:
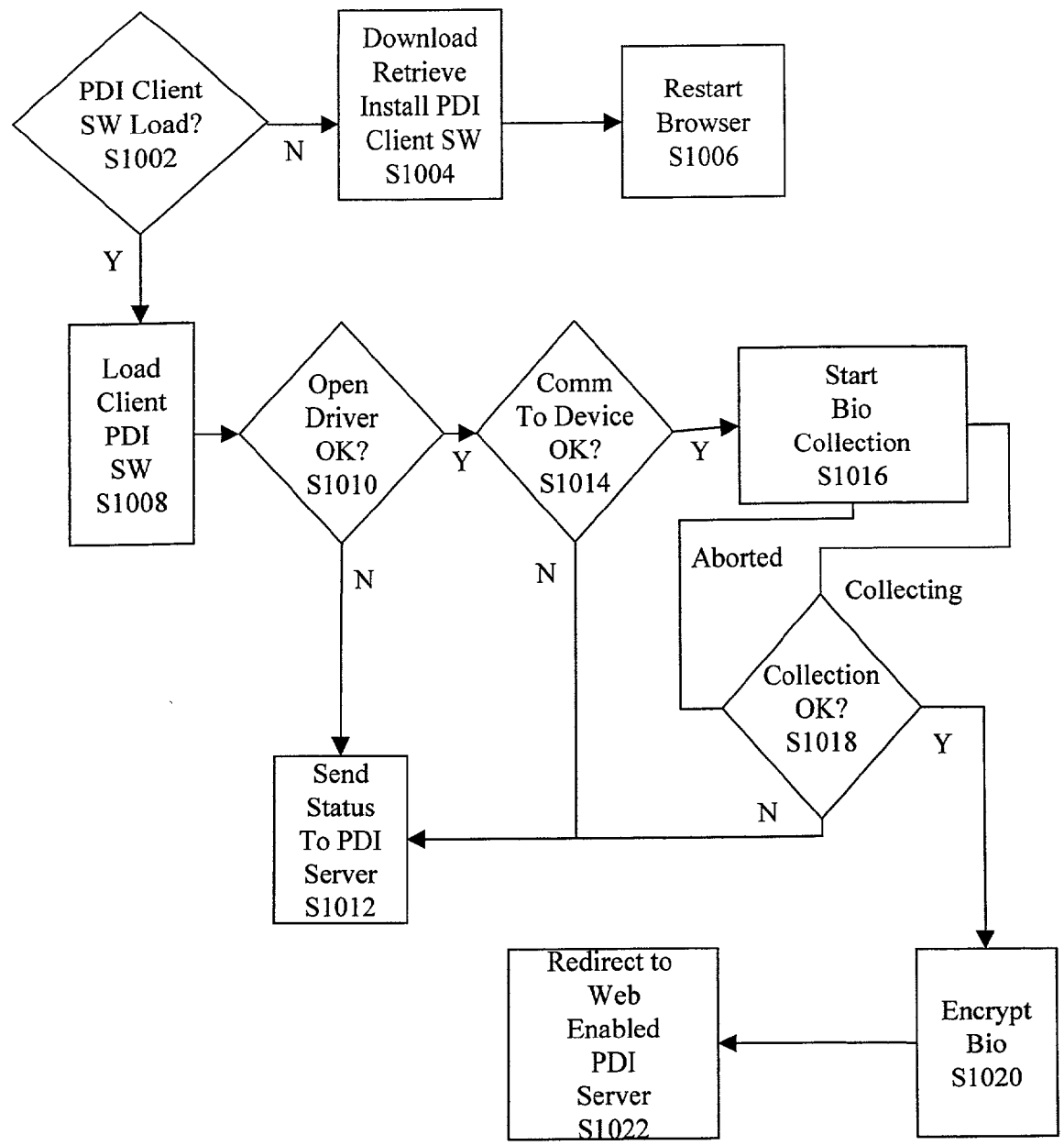
FIG. 10 is a flowchart illustrating an example of the Client Software Process.

FIG. 10 is a diagram illustrating an example of the flow of control for the PDI Client Software 102d, which is installed on the Client workstation 102. Generally, this software allows the workstation to communicate between the PDI web server 204 and the Client browser 102c, through use of standard plug-in or COM interface elements, for the purpose of collecting biometric data.

In one example of the invention, browsers such as Netscape Communicator load the PDI Client Software 102d as a standard plug-in module, which is invoked by the browser in response to MIME types assigned to the PDI system 100, for example. If a consumer's browser does not have the necessary PDI Client Software 102d, the PDI registration process is preferably able to detect this condition, and can redirect the consumer to the proper web location for downloading and installation instructions.

Invocation of the PDI Client Software 102d in response to assigned MIME types includes data elements sent by the PDI system 100. Because user authentication must be associated with a particular purchase transaction, session information is sent directly to the Client browser 102c, which is in turn passed to the PDI Client Software 102d. For example, the PDI web server 204 initiates a biometric user authentication request on the consumer's computer by specifying a predetermined MIME type, and passing certain state variables along with the request. These state variables include SESSION, which identifies the context of the purchase transaction and ENCRYPTION, which details the encryption algorithms/key sizes to be applied to the returned data.

The PDI Client software 102d of the present invention preferably includes functionality supporting the collection of user authentication credentials. Depending on the nature of the credentials requested from the PDI system 100, the PDI Client software 102d may be required to communicate with hardware devices on the Client workstation 102. For example, the PDI system can be configured to acquire fingerprint biometric data directly from the consumer's hardware collection device 102b. In this situation, the PDI Client Software 102d would control a fingerprint reader directly. In contrast, the PDI system 100 may require simple user authentication, such as the supply of a Digital Code, which would be collected through standard HTML form input.

As shown in FIG. 10, in response to the MIME type application/x-pdi (file extension pdi), for example, an attempt is made to load the PDI Client Software 102d by web browser 102c. If the appropriate plug-in module cannot be found, or cannot be loaded correctly due to version mismatches (determined in block S1002), the browser is instructed to redirect the consumer to a PDI-controlled location for the purpose of downloading the client software (block S1004). Once downloaded and installed, the consumer must restart the browser in order to continue (block S1006).

Once the appropriate PDI plug-in module is loaded by the browser (block S1008), an internal check is conducted to determine if communication between the PDI software and the biometric hardware device 102b is working correctly. This involves the opening of driver files which control the hardware unit (block S1010). If the drivers cannot be properly opened, a status message is immediately returned to the PDI web server 204 (block S1012). This feedback is used to inform the consumer that user authentication cannot continue due to hardware or software errors on the Client computer 102. Error data such as this may also be used to facilitate reporting of problem devices, and to allow customer care to address installation problems encountered by a base of consumers.

Successful communication between the biometric device 102b and the PDI Client Software 102d is checked, to ensure that the device is responding to capture and identity requests (block S1014). If this communication fails, or if errors are detected, the same status messaging between the PDI web server 204 and the software is initiated as described above. For example, a unique status code can be returned to the PDI system, detailing the nature of the error encountered (block S1012).

Biometric collection of the hardware 102b unit is initiated by the present invention after all validation checks have completed normally (block S1016). This process presents a feedback mechanism to the consumer directly within the current web page being viewed, or maps a separate window on the Client workstation 102. This feedback mechanism shows the consumer the current fingerprint image being presented on the hardware unit, as well as pressure and coverage parameters. This feedback data allows the consumer to adjust finger position, pressure sensitivity, coverage placement, etc., based upon the information provided by the PDI Client Software 102d. Because the presentation of fingerprint biometric data often requires practice on the part of the consumer, this feedback data allows the individual to more easily learn to use the hardware device.

The present invention also allows the consumer to abort a current biometric collection, releasing control of the Client browser 102c from PDI. Aborting a user authentication request, however, will send status data to the PDI web server 204 indicating that the authentication process was manually stopped by the consumer (blocks S1018/S1012). A biometric collection that is aborted is regarded as unsuccessful user authentication, and the PDI system 100 determines the next course of action based upon business rules of the system.

Successful collection of biometric data as determined in block S1018 results in encapsulation of the information into minutiae points, which are digital characterizations of the fingerprint information. The manner in which this data is digitally converted is determined by the hardware manufacturer of the biometric unit, and is vendor-supplied. Prior to transmission of this user authentication information, the minutiae points must be encrypted. Encryption is conducted based upon parameters sent by the PDI web server 204, instructing the PDI Client Software 102d as to the nature of the encryption algorithm(s) and key sizes to use (block S1020).

Upon completion of the encryption process, the biometric data is forwarded to the PDI web server 204, and includes all original SESSION information contained within the request (block S1022). As a result, this user authentication information is then associated with a particular purchase transaction, allowing evaluation of the submitted credentials to continue.

Although the above discussion refers to an example of the invention where fingerprints are used as the biometric authentication data, it should be noted that other types of biometric and personal identification indicia (i.e. tags) are possible, such as voice patterns, eye patterns (retina or iris), face patterns (e.g. infrared or optical), handwriting, keystroke entry patterns, gait, modus operandi profiles, etc.

The examples of the processing depicted in the above figures is meant to be illustrative rather than limiting. Those skilled in the art, after being taught by the above examples, will appreciate that many modifications can be made to the above methods, including substitution, elimination, consolidation and re-ordering of many process steps, while remaining within the scope and purpose of the present invention.

Further, although the present invention has been described in detail with reference to the preferred embodiments thereof, those skilled in the art will appreciate that various substitutions and modifications can be made to the examples described herein while remaining within the spirit and scope of the invention as defined in the appended claims.

What is claimed is:

1. A method that is implemented by a computer for reducing the occurrence of unauthorized use of on-line resources, comprising:
   storing business rules for a plurality of companies having on-line resources;
   receiving a message indicating a request from a user to use on-line resources;
   identifying a company associated with the requested on-line resource from among the plurality of companies;
   retrieving the stored business rules for the identified company;
   determining whether the request requires authentication;
   enabling the request to be fulfilled without authentication if the determination indicates that authentication is not required;
   obtaining an indicia of physical identification from the user if the determination instead indicates that authentication is required;
   comparing the obtained indicia to a stored indicia for the user; and
   enabling the request to be fulfilled if the obtained indicia matches the stored indicia,
   wherein the step of determining whether the request requires authentication includes determining whether stored business rules for the identified company associated with the requested on-line resource indicates that authentication for the user is required, and
   wherein at least the determining and comparing steps are implemented by the computer.

2. A method according to claim 1, wherein the step of determining whether the request requires authentication includes:
   retrieving a stored profile containing the user's historical authentication patterns with respect to a plurality of network elements;
   identifying certain network elements of the plurality of network elements in the stored profile as being associated with the requested on-line resource;
   determining a score for the user based on the user's historical authentication patterns with the certain network elements; and
   determining whether authentication is required for this request to use the on-line resource based on the score.

3. A method according to claim 1, wherein the step of determining whether the stored business rules requires authentication includes:
   determining whether the user is listed by the company as always requiring authentication; and
   requiring authentication if the user is listed.

4. A method according to claim 1, wherein the step of determining whether the stored business rules requires authentication includes:
   determining whether the user is listed by the company as never requiring authentication; and
   not requiring authentication if the user is listed.

5. A method according to claim 1, wherein the step of determining whether the stored business rules requires authentication includes:
   determining whether the user is listed by the company as being completely denied access; and
   completely denying access to the requested on-line resources if the user is listed.

6. A method according to claim 1, wherein the step of determining whether the request requires authentication includes determining whether the request is indicative of fraudulent behavior.

7. A method according to claim 6, wherein the fraudulent behavior is one or more of a collision violation, a velocity violation, and a customized trigger.

8. A method according to claim 1, further comprising:
   determining whether the request is a card transaction;
   determining whether restrictions applied to the user and an account associated with the request are satisfied by a purchase associated with the request; and
   denying the request if the restrictions are not satisfied.

9. A method according to claim 8, wherein the restrictions are one or more of type of goods to be purchased, amount of purchase, time of purchase and location of purchase.

10. A method according to claim 1, further comprising:
    determining whether the request is an account transaction;
    determining whether restrictions applied to an account associated with the account transaction are satisfied by the request; and
    denying the request if the restrictions are not satisfied.

11. A method according to claim 10, wherein the restrictions are one or more of frequency of access and time of access.

12. A method according to claim 1, further comprising:
    determining whether the request is an account transaction;
    determining whether use of the requested on-line resources are restricted for an account associated with the user; and
    denying the request if the requested on-line resources are restricted for the account.

13. A method according to claim 1, further comprising:
    determining whether the request is a control transaction;
    determining whether restrictions applied to the user associated with the control transaction are satisfied by the request; and
    denying the request if the restrictions are not satisfied.

14. A method according to claim 13, wherein the restrictions are one or more of a parent control and an other control.

15. A method according to claim 1, wherein the indicia comprises a biometric that is one or more of a fingerprint, a voiceprint, a palmprint, an eye scan, and a handwriting sample.

16. A method according to claim 1, further comprising providing access to the plurality of companies to allow them to configure their own individual set of stored business rules that are used in the determining step.

17. An apparatus for reducing the occurrence of unauthorized use of on-line resources, comprising:
    means for storing business rules for a plurality of companies having on-line resources;
    means for receiving a message indicating a request from a user to use on-line resources;
    means for identifying a company associated with the requested on-line resource from among the plurality of companies;
    means for retrieving the stored business rules for the identified company;
    means for determining whether the request requires authentication;
    means for enabling the request to be fulfilled without authentication if the determination indicates that authentication is not required;
    means for obtaining an indicia of physical identification from the user if the determination instead indicates that authentication is required;
    means for comparing the obtained indicia to a stored indicia for the user; and
    means for enabling the request if the obtained indicia matches the stored indicia, wherein the means for determining whether the request requires authentication includes means for determining whether stored business rules for the identified company associated with the requested on-line resource indicates that authentication for the user is required.

18. An apparatus according to claim 17, wherein the means for determining whether the request requires authentication includes:
   means for retrieving a stored profile containing the user's historical authentication patterns with respect to a plurality of network elements;
   means for identifying certain network elements of the plurality of network elements in the stored profile as being associated with the requested on-line resource;
   means for determining a score for the user based on the user's historical authentication patterns with the certain network elements; and
   means for determining whether authentication is required for this request to use the on-line resource based on the score.

19. An apparatus according to claim 17, wherein the means for determining whether the stored business rules requires authentication includes:
   means for determining whether the user is listed by the company as always requiring authentication; and
   means for requiring authentication if the user is listed.

20. An apparatus according to claim 17, wherein the means for determining whether the stored business rules requires authentication includes:
   means for determining whether the user is listed by the company as never requiring authentication; and
   means for not requiring authentication if the user is listed.

21. An apparatus according to claim 17, wherein the means for determining whether the stored business rules requires authentication includes:
   means for determining whether the user is listed by the company as being completely denied access; and
   means for completely denying access to the requested on-line resources if the user is listed.

22. An apparatus according to claim 17, wherein the means for determining whether the request requires authentication includes means for determining whether the request is indicative of fraudulent behavior.

23. An apparatus according to claim 22, wherein the fraudulent behavior is one or more of a collision violation, a velocity violation, and a customized trigger.

24. An apparatus according to claim 17, further comprising:
   means for determining whether the request is a card transaction;
   means for determining whether restrictions applied to the user and an account associated with the request are satisfied by a purchase associated with the request; and
   means for denying the request if the restrictions are not satisfied.

25. An apparatus according to claim 24, wherein the restrictions are one or more of type of goods to be purchased, amount of purchase, time of purchase and location of purchase.

26. An apparatus according to claim 17, further comprising:
   means for determining whether the request is an account transaction;
   means for determining whether restrictions applied to an account associated with the account transaction are satisfied by the request; and
   means for denying the request if the restrictions are not satisfied.

27. An apparatus according to claim 26, wherein the restrictions are one or more of frequency of access and time of access.

28. An apparatus according to claim 17, further comprising:
   means for determining whether the request is an account transaction;
   means for determining whether use of the requested on-line resources are restricted for an account associated with the user; and
   means for denying the request if the requested on-line resources are restricted for the account.

29. An apparatus according to claim 17, further comprising:
   means for determining whether the request is a control transaction;
   means for determining whether restrictions applied to the user associated with the control transaction are satisfied by the request; and
   means for denying the request if the restrictions are not satisfied.

30. An apparatus according to claim 29, wherein the restrictions are one or more of a parent control and an other control.

31. An apparatus according to claim 30, wherein the indicia comprises a biometric that is one or more of a fingerprint, a voiceprint, a palmprint, an eye scan, and a handwriting sample.

32. An apparatus according to claim 17, further comprising means for providing access to the plurality of companies to allow them to configure their own individual set of stored business rules that are used by the determining.

33. An apparatus including a computer processor for reducing the occurrence of unauthorized use of on-line resources, comprising:
   a server that is adapted to communicate with a network based service so as to receive a message indicating a request from a user to use the network based service;
   a rules subsystem coupled to the server that determines whether the request requires authentication, the rules subsystem causing the server to enable the request to be fulfilled without authentication if the determination indicates that authentication is not required and causes the server to obtain an indicia of physical identification from the user if the rules subsystem instead determines that authentication is required; and
   a business rules database coupled to the rules subsystem, the database storing business rules for a plurality of companies having on-line resources;
   an authentication subsystem coupled to the server that compares the obtained indicia to a stored indicia for the user,
   wherein the rules subsystem is adapted to identify a company associated with the requested on-line resource from among the plurality of companies, retrieve the stored business rules for the identified company from the business rules database and determine whether the stored business rules for the identified company associated with the requested on-line resource requires authentication for the user, and
   wherein the server sends a signal to the network based service that the request is to be fulfilled if the authentication subsystem determines that the obtained indicia matches the stored indicia.

34. An apparatus according to claim 33, further comprising:
- a profile database coupled to the rules subsystem, the profile database maintaining a stored profile containing the user's historical authentication patterns with respect to a plurality of network elements,
- wherein the rules subsystem is adapted to retrieve the user's stored profile from the profile database in response to the request, identify certain network elements of the plurality of network elements in the stored profile as being associated with the requested on-line resource, determine a score for the user based on the user's historical authentication patterns with the certain network elements, and to determine whether authentication is required for the user for this request to use the on-line resource based on the score.

35. An apparatus according to claim 33, further comprising a user profile subsystem coupled to the server which is adapted to determine whether the request is indicative of fraudulent behavior, wherein the fraudulent behavior is one or more of a collision violation, a velocity violation, and a customized trigger.

36. An apparatus according to claim 33, wherein the indicia is a biometric, the apparatus further comprising a biometrics database that stores a plurality of biometrics for a respective plurality of users, and wherein the plurality of biometrics includes one or more of a fingerprint, a voiceprint, a palmprint, an eye scan, and a handwriting sample.

37. A method according to claim 2, wherein the step of determining the score includes:
- applying a weight to each of the certain network elements based on a relative importance of the certain network elements;
- evaluating the user's historical relationship with each of the certain network elements; and
- aggregating the score using the weighted evaluations.

38. A method according to claim 37, further comprising:
- allowing a system administrator to configure the respective weights for the plurality of network elements.

39. An apparatus according to claim 18, wherein the means for determining the score includes:
- means applying a weight to each of the certain network elements based on a relative importance of the certain network elements;
- means evaluating the user's historical relationship with each of the certain network elements; and
- means for aggregating the score using the weighted evaluations.

40. An apparatus according to claim 39, further comprising:
- means for allowing a system administrator to configure the respective weights for the plurality of network elements.

41. An apparatus according to claim 33, wherein the rules subsystem is further adapted to apply a weight to each of the certain network elements based on a relative importance of the certain network elements, evaluate the user's historical relationship with each of the certain network elements, and aggregate the score using the weighted evaluations.

42. An apparatus according to claim 41, further comprising:
- an administrator service that allows a system administrator to configure the respective weights for the plurality of network elements.

* * * * *